(12) United States Patent
Joshi

(10) Patent No.: US 10,868,810 B2
(45) Date of Patent: Dec. 15, 2020

(54) VIRTUAL REALITY (VR) SCENE-BASED AUTHENTICATION METHOD, VR DEVICE, AND STORAGE MEDIUM

(71) Applicant: TENCENT TECHNOLOGY (SHENZHEN) COMPANY LIMITED, Shenzhen (CN)

(72) Inventor: Dhaval Jitendra Joshi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 119 days.

(21) Appl. No.: 16/205,708

(22) Filed: Nov. 30, 2018

(65) Prior Publication Data

US 2019/0098005 A1    Mar. 28, 2019

Related U.S. Application Data

(63) Continuation of application No. PCT/CN2017/095640, filed on Aug. 2, 2017.

(30) Foreign Application Priority Data

| Aug. 19, 2016 | (CN) | 2016 1 0695148 |
| Oct. 18, 2016 | (CN) | 2016 1 0907039 |
| Oct. 27, 2016 | (CN) | 2016 1 0954866 |

(51) Int. Cl.
  *G06F 21/00* (2013.01)
  *H04L 29/06* (2006.01)
  (Continued)

(52) U.S. Cl.
  CPC .......... *H04L 63/0861* (2013.01); *G06F 3/011* (2013.01); *G06F 3/0346* (2013.01);
  (Continued)

(58) Field of Classification Search
  CPC .......... G06F 21/32; G06F 21/36; G06F 3/011; G06F 3/0346; G06K 9/00013;
  (Continued)

(56) References Cited

U.S. PATENT DOCUMENTS

| 2010/0064359 A1 | 3/2010 | Boss et al. |
| 2010/0153722 A1 | 6/2010 | Bauchot et al. |

(Continued)

FOREIGN PATENT DOCUMENTS

| CA | 2658174 A1 | 9/2010 |
| CN | 1787532 A | 6/2006 |

(Continued)

OTHER PUBLICATIONS

The World Intellectual Property Organization (WIPO) International Search Report for PCT/CN2017/095640 dated Oct. 23, 2017 8 Pages (including translation).

(Continued)

*Primary Examiner* — Joseph P Hirl
*Assistant Examiner* — Ka Shan Choy
(74) *Attorney, Agent, or Firm* — Anova Law Group, PLLC

(57) ABSTRACT

The present disclosure discloses a virtual reality (VR) scene-based authentication method, a VR device, and a storage medium. The method includes: receiving an authentication request in a VR scene; collecting to-be-authenticated fingerprint information by using a fingerprint collection device in a physical scene; sending the to-be-authenticated fingerprint information to an authenticator in the physical scene; and receiving, in the VR scene, authentication result information sent by the authenticator, where the authentication result information is used to indicate whether the to-be-authenticated fingerprint information has passed the authentication.

18 Claims, 29 Drawing Sheets

(51) Int. Cl.
*G06K 9/00* (2006.01)
*G06F 21/32* (2013.01)
*G06F 21/36* (2013.01)
*G06F 3/01* (2006.01)
*G06F 3/0346* (2013.01)
*G06Q 20/40* (2012.01)

(52) U.S. Cl.
CPC .............. *G06F 21/32* (2013.01); *G06F 21/36* (2013.01); *G06K 9/00671* (2013.01); *G06Q 20/40145* (2013.01); *G06K 9/00013* (2013.01); *G06K 9/00087* (2013.01)

(58) Field of Classification Search
CPC ........... G06K 9/00087; G06K 9/00671; G06Q 20/40145; H04L 63/0861
See application file for complete search history.

(56) References Cited

U.S. PATENT DOCUMENTS

| | | | |
|---|---|---|---|
| 2015/0128292 A1 | 5/2015 | Malecki et al. | |
| 2015/0339468 A1* | 11/2015 | Son | G06F 3/017 726/19 |
| 2016/0034039 A1 | 2/2016 | Maeda et al. | |
| 2016/0188861 A1 | 6/2016 | Todeschini | |
| 2017/0301138 A1 | 10/2017 | Han | |
| 2017/0364920 A1* | 12/2017 | Anand | G06Q 20/40145 |

FOREIGN PATENT DOCUMENTS

| | | |
|---|---|---|
| CN | 101808702 A | 8/2010 |
| CN | 102270275 A | 12/2011 |
| CN | 102368288 A | 3/2012 |
| CN | 102446192 A | 5/2012 |
| CN | 103135930 A | 6/2013 |
| CN | 103279304 A | 9/2013 |
| CN | 103701614 A | 4/2014 |
| CN | 104102357 A | 10/2014 |
| CN | 104182670 A | 12/2014 |
| CN | 104408338 A | 3/2015 |
| CN | 105867637 A | 8/2016 |
| CN | 105955453 A | 9/2016 |
| CN | 105955470 A | 9/2016 |
| CN | 106131057 A | 11/2016 |
| CN | 106527887 A | 3/2017 |
| EP | 2189884 A1 | 5/2010 |

OTHER PUBLICATIONS

The State Intellectual Property Office of the People's Republic of China (SIPO) Office Action 1 for 201610695148.0 dated Jun. 22, 2018 6 Pages (including translation).
The State Intellectual Property Office of the People's Republic of China (SIPO) Office Action 1 for 201610907039.0 dated Aug. 22, 2017 8 Pages (including translation).
The State Intellectual Property Office of the People's Republic of China (SIPO) Office Action 2 for 201610907039.0 dated Dec. 29, 2017 8 Pages (including translation).
The European Patent Office (EPO) The Extended European Search Report for 17840945.4 dated Jul. 24, 2019 11 Pages.
The State Intellectual Property Office of the People's Republic of China (SIPO) Office Action 1 for 201610954866.5 dated Jun. 11, 2020 13 Pages (including translation).
TESTV is it worth buying, "[TESTV I is it worth buying] The immersion you want," URL: https://www.iqiyi.com/v_19rrm86s7c.html, Jul. 14, 2016 (Jul. 14, 2016), 8 minutes 05 seconds to 8 minutes 50 seconds of the video 2 Pages.

* cited by examiner

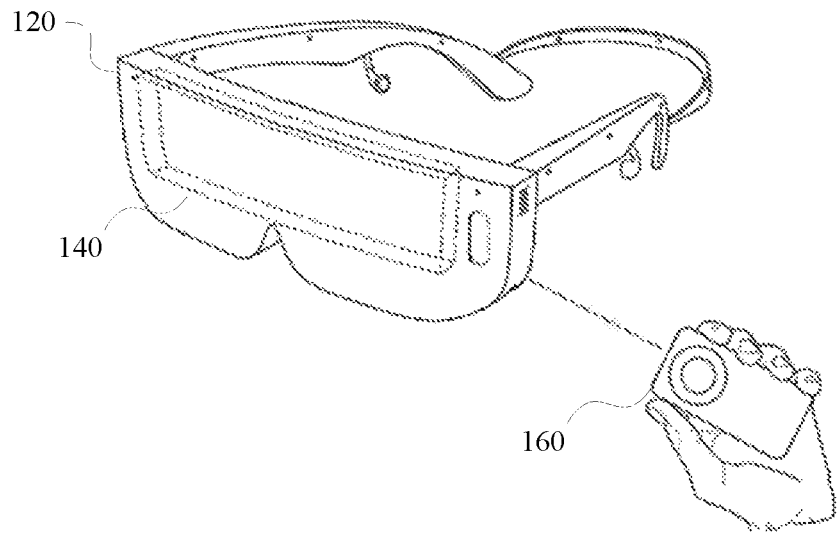

FIG. 16

Determine a location of an operation focal point in a three-dimensional virtual environment, where the operation focal point is a point corresponding to an input device in the three-dimensional virtual environment, the three-dimensional virtual environment includes a virtual object, and the virtual object includes a controlled point used for receiving an operation — 1701

Determine a three-dimensional operation range of the operation focal point by using the operation focal point as a reference location — 1702

Determine a virtual object whose controlled point is located in the three-dimensional operation range as a selected virtual object when an operation instruction is received — 1703

FIG. 17

VIRTUAL REALITY (VR) SCENE-BASED AUTHENTICATION METHOD, VR DEVICE, AND STORAGE MEDIUM

RELATED APPLICATIONS

This application is a continuation application of PCT Patent Application No. PCT/CN2017/095640, filed on Aug. 2, 2017, which claims priority to Chinese Patent Application No. 201610695148.0, filed on Aug. 19, 2016, Chinese Patent Application No. 201610907039.0, filed on Oct. 18, 2016, Chinese Patent Application No. 201610954866.5, filed on Oct. 27, 2016, all of which is incorporated herein by reference in their entireties.

FIELD OF THE TECHNOLOGY

The present disclosure relates to the field of virtual reality (VR) and, in particular, to a VR scene-based authentication method, a VR device, and a storage medium.

BACKGROUND OF THE DISCLOSURE

Virtual reality (VR) is a three-dimensional virtual world generated through computer simulation, to provide users with visual, auditory, haptic, or any other sensory simulations, so that the users can timely observe objects in three-dimensional space without limitation as if they are actually on the scene. Currently, a helmet-mounted display, as a common device in a VR technology, can provide high-resolution virtual scene with a large field angle when shielding the real world, and has a stereo headphone, so that people can be deeply immersed in the virtual scene. Currently, a service provider can provide various types of services and products according to requirements of users in a VR scene. For example, a user can purchase a product and make a payment in the VR scene. However, a payment authentication system needs to be set up in a VR scene for making the payment in the VR scene, and as a result, the payment efficiency in the VR scene is low. Currently, no effective resolution has been presented for these problems.

SUMMARY

Embodiments of the present disclosure provide a virtual reality (VR) scene-based authentication method, a VR device, and a storage medium, to resolve at least the technical problems that a payment authentication system must be set up for making payments in a VR scene, resulting low efficiency in making the payments in the VR scene.

One aspect of the embodiments of the present disclosure provides a VR scene-based authentication method, including: receiving an authentication request in a VR scene; collecting to-be-authenticated fingerprint information by using a fingerprint collection device in a physical scene; sending the to-be-authenticated fingerprint information to an authenticator in the physical scene; and receiving, in the VR scene, authentication result information sent by the authenticator, the authentication result information being used to indicate whether the to-be-authenticated fingerprint information has passed the authentication.

Another aspect of the embodiments of the present disclosure provides a VR device. The VR device includes a memory, configured for storing program instructions, and one or more processor, coupled with the memory and when, executing the program instructions, configured for: receiving an authentication request in a VR scene; collecting to-be-authenticated fingerprint information by using a fingerprint collection device in a physical scene; sending the to-be-authenticated fingerprint information to an authenticator in the physical scene; and receiving, in the VR scene, authentication result information sent by the authenticator, the authentication result information being used to indicate whether the to-be-authenticated fingerprint information has passed the authentication.

Another aspect of the embodiments of the present disclosure provides a non-transitory computer-readable storage medium, containing program instructions for, when executed by a processor, performing a virtual reality (VR) scene-based authentication method. The method includes: receiving an authentication request in a VR scene; collecting to-be-authenticated fingerprint information by using a fingerprint collection device in a physical scene; sending the to-be-authenticated fingerprint information to an authenticator in the physical scene; and receiving, in the VR scene, authentication result information sent by the authenticator, the authentication result information being used to indicate whether the to-be-authenticated fingerprint information has passed the authentication.

As such, the authentication request is received in the VR scene, the to-be-authenticated fingerprint information is collected by using the fingerprint collection device in the physical scene, the to-be-authenticated fingerprint information is sent to the authenticator in the physical scene, and the authentication result information sent by the authenticator is received in the VR scene, and the authentication result information is used to indicate whether the to-be-authenticated fingerprint information has passed the authentication. Therefore, when the authentication request is received in the VR scene, the to-be-authenticated fingerprint information collected by the fingerprint collection device in the physical scene is sent to the authenticator in the physical scene for authentication, so that payment authentication can be implemented without setting up a payment authentication system in the VR scene, and the technical effect of improving the payment efficiency in the VR scene is implemented, thereby resolving the technical problems in the related technology that a payment authentication system must be set up for making payments in a VR scene, resulting low efficiency in making the payments in the VR scene.

BRIEF DESCRIPTION OF THE DRAWINGS

The accompanying drawings described herein are used for providing further understanding of the present disclosure, and constitute a part of the present disclosure. Exemplary embodiments of the present disclosure and explanations thereof are used for explaining the present disclosure, but do not constitute a limitation to the present disclosure. In the accompanying drawings:

FIG. 16 is a schematic structural diagram of a VR system according to an exemplary embodiment of the present disclosure;

FIG. 17 is a flowchart of a virtual object selection method according to an exemplary embodiment of the present disclosure;

DESCRIPTION OF EMBODIMENTS

To make a person skilled in the art understand the technical solutions in the present disclosure better, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

It should be noted that terms "first", "second", and the like in the specification, claims, and accompanying drawings of the present disclosure are used for distinguishing between similar objects, but are not used for describing a particular sequence or a precedence order. It should be understood that, used data may be interchanged in suitable situations, so that the described embodiments of the present disclosure can be implemented in a sequence other than the sequence described herein or shown in the figure. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Virtual reality (VR) technology provides, by comprehensively using a computer graphics system and various physical and control interface devices, an immersion feeling in an interactive three-dimensional environment generated at least partially on a computer. The interactive three-dimensional environment generated on the computer is referred to as a virtual environment. The computer simulation system is capable of creating and experiencing a virtual world. In the VR technology, a simulated environment is generated by using a computer, and users are deeply immersed into the environment through system simulation of an interactive three-dimensional vision with multi-source information fusion and an physical behavior.

Exemplary Embodiment 1

VR scene-based authentication methods are provide according to an exemplary embodiment of the present disclosure.

Figure 1:
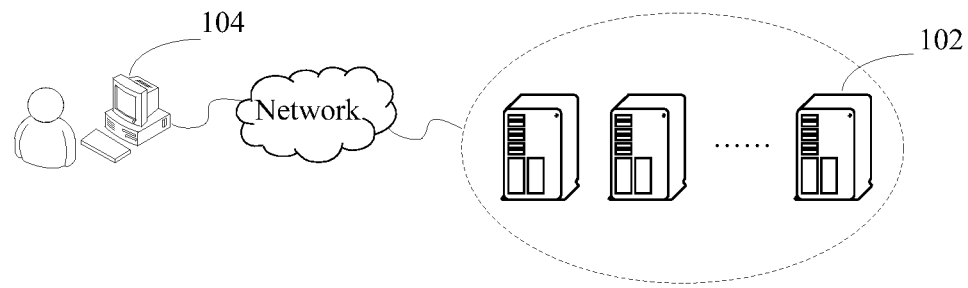
FIG. 1 is a schematic diagram of a hardware environment of a VR scene-based authentication method according to an exemplary embodiment of the present disclosure.

Optionally, the VR scene-based authentication method may be applied to a hardware environment formed by a server 102 and a terminal 104 as shown in FIG. 1. The server 102 is connected to the terminal 104 through a network. The network includes but is not limited to a wide area network, a metropolitan area network, or a local area network, and the terminal 104 is not limited to a personal computer (PC), a mobile phone, and a tablet computer. The VR scene-based authentication method in the present disclosure may be performed by the server 102, or may be performed by the terminal 104, or may be performed by the server 102 and the terminal 104 together. The VR scene-based authentication method of the present disclosure may further be performed by a client installed on the terminal 104.

Figure 2:
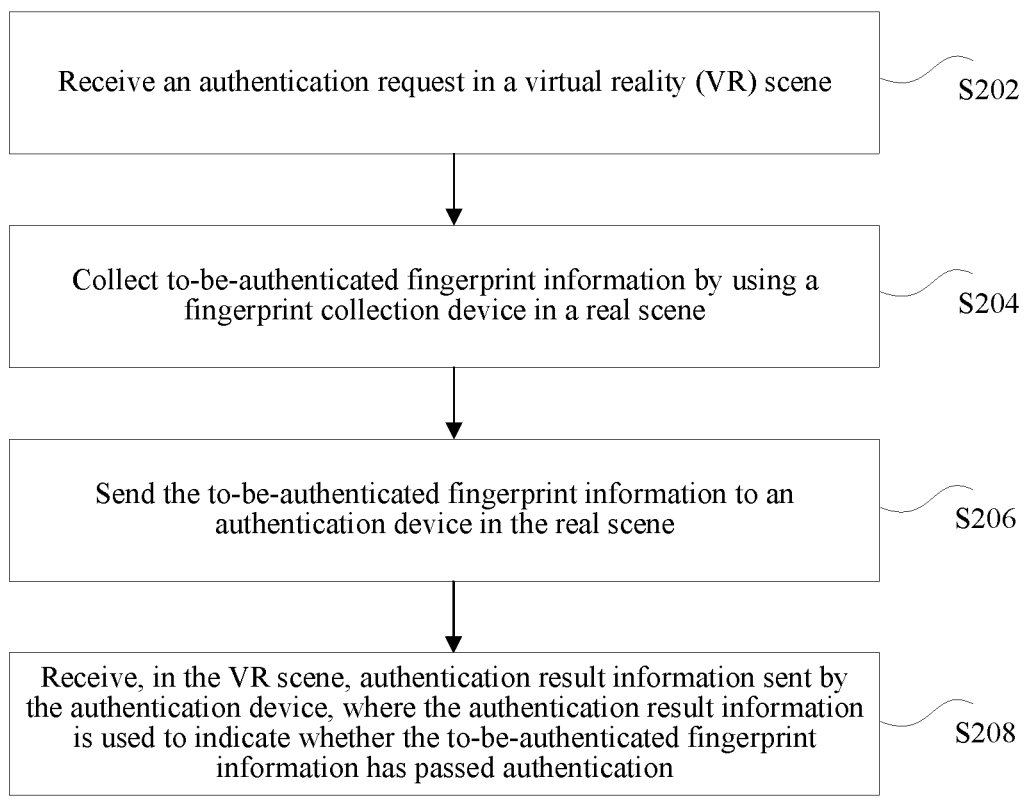
FIG. 2 is a flowchart of an optional VR scene-based authentication method according to an exemplary embodiment of the present disclosure.

FIG. 2 is a flowchart of an optional VR scene-based authentication method according to an exemplary embodiment of the present disclosure. As shown in FIG. 2, the method may include the following exemplary steps.

S202. Receiving an authentication request in the VR scene.

S204. Collecting to-be-authenticated fingerprint information by using a fingerprint collection device in a physical scene (or a real scene).

S206. Sending the to-be-authenticated fingerprint information to an authenticator in the physical scene.

S208. Receiving, in the VR scene, authentication result information sent by the authenticator, where the authentication result information is used to indicate whether the to-be-authenticated fingerprint information has passed or unpassed the authentication.

It should be noted that S202 to S208 may be performed by a VR device, for example, a helmet-mounted display or light valve glasses. In S202 to S208, when the authentication request is received in the VR scene, the to-be-authenticated fingerprint information collected by the fingerprint collection device in the physical scene is sent to the authenticator in the physical scene for authentication, so that payment authentication can be implemented without setting up a payment authentication system in the VR scene, and the technical effect of improving the payment efficiency in the VR scene is implemented, thereby resolving technical problems in the related technology that a payment authentication system must be set up for making payments in a VR scene, resulting low efficiency in making the payments in the VR scene.

In the technical solution provided in S202, the VR scene may be a displayed scene capable of presenting the VR device in the VR scene. The VR device may be a helmet-mounted display, light-valve glasses, or the like. The authentication request may be a request triggered when a target authentication event is executed in the VR scene. The present disclosure does not For example limit the target authentication event. For example, the target authentication event may be a payment authentication event needing to be executed during payment in the VR scene, or an authority authentication event needing to be executed when an event needing authority authentication is executed in the VR scene. The VR device may detect, in real time in the VR scene, whether the target authentication event exists, and if the VR device detects that the target authentication event exists and a trigger operation for executing the target authentication event exists, generation of the authentication request is triggered in the VR scene. As such, the VR device detects the authentication request in real time, so that a response time for the authentication request can be shortened, and further, the efficiency of executing the target authentication event in the VR scene can be improved.

It should be noted that after receiving the authentication request, the VR device may display prompt information in the VR scene, and the prompt information may be used to prompt a user to enter authentication information indicated in the authentication request, to complete an authentication operation indicated in the target authentication event. For example, the prompt information is displayed in the VR scene, so that the user can be prompted intuitively to perform the authentication operation, and use experience of the user is effectively improved.

In the technical solution provided in S204, the user may perform the authentication operation according to the prompt information displayed in the VR scene. The authentication operation performed by the user may be entering to-be-authenticated information, for example, fingerprint information, voice information, or facial recognition information. The present disclosure is described by using the fingerprint information as an example. For example, the user may enter the to-be-authenticated fingerprint information by using the fingerprint collection device in the physical scene. Herein, it should be noted that the fingerprint collection device may be a fingerprint scanner or another device capable of scanning and collecting a fingerprint. A fingerprint collection region may be disposed in the fingerprint collection device, and the user may place a finger on the fingerprint collection region to complete fingerprint collection. The to-be-authenticated fingerprint information may be information about a fingerprint entered by the user on the fingerprint collection device, and the to-be-authenticated fingerprint information may be a fingerprint image, fingerprint feature information, or the like.

It should be further noted that the fingerprint collection device may be in communication with the VR device. The communication connection may include, e.g., wireless connection, such as, Bluetooth, or wireless fidelity (WiFi). The fingerprint collection device may send the collected to-be-authenticated fingerprint information to the VR device by using the communication connection between the fingerprint collection device and the VR device, so that the VR device responds to the authentication request in the VR scene according to the received to-be-authenticated fingerprint information, to complete the authentication.

In the technical solution provided in S206, after receiving the to-be-authenticated fingerprint information collected by the fingerprint collection device, the VR device may send the to-be-authenticated fingerprint information to the authenticator in the physical scene for authentication. Herein, it should be noted that the present disclosure does not specifically limit the authenticator in the physical scene. For example, the authenticator may be Alipay, or a bank payment authentication platform. The authenticator in the physical scene may be in communication connection with the VR device, and the communication connection may be, e.g., a wireless connection, such as, Bluetooth or WiFi. The VR device may send the to-be-authenticated fingerprint information to the authenticator by using the communication connection between the authenticator and the VR device, so that the authenticator performs authentication.

It should be further noted that the authenticator may pre-store fingerprint information of the user. Herein, it should be noted that the authenticator may store fingerprint information of multiple users, and the fingerprint information is in unique correspondence with the user. After receiving the to-be-authenticated fingerprint information, the authenticator may first determine whether there is fingerprint information the same as the to-be-authenticated fingerprint information, and if there is no fingerprint information the same as the to-be-authenticated fingerprint information, the authenticator may directly determine that the to-be-authenticated fingerprint information has unpassed the authentication, or if there is fingerprint information the same as the to-be-authenticated fingerprint information, the authenticator may continue to authenticate information about a user corresponding to the to-be-authenticated fingerprint information according to a correspondence between fingerprint information and a user, and if the information about the user corresponding to the to-be-authenticated fingerprint information is legal, the authenticator may determine that the to-be-authenticated fingerprint information has passed the authentication, or otherwise, determine that the to-be-authenticated fingerprint information has unpassed the authentication.

In the technical solution provided in S208, after authenticating the to-be-authenticated fingerprint information, the authenticator in the physical scene may feedback the authentication result information to the VR device by using the communication connection between the authenticator and the VR device. The authentication result information may be used to indicate whether the to-be-authenticated fingerprint information has passed the authentication, and may include that the to-be-authenticated fingerprint information has passed the authentication and the to-be-authenticated fingerprint information has unpassed the authentication.

In an optional embodiment, after the VR device receives, in S208, the authentication result information sent by the authenticator, S210 may further be performed. Display the authentication result information in the VR scene. It should be noted that the present disclosure does not specifically limit a manner of displaying the authentication result information in the VR scene. The authentication result information is displayed in the VR scene, so that the user can clearly and intuitively obtain the authentication result information of the to-be-authenticated fingerprint information, better satisfying the user requirement, and effectively improving the use experience of the user.

In an optional embodiment, after performing S202 of receiving the authentication request in the VR scene, and before performing S204 of collecting the to-be-authenticated fingerprint information by using the fingerprint collection device in the physical scene, the following exemplary steps may further be performed.

S2032. Determining whether an indication identifier is directed to an authentication region in the VR scene, where the indication identifier is generated by the fingerprint collection device in the VR scene.

S2034. Displaying prompt information in the VR scene when it is determined that the indication identifier is directed to the authentication region, where the prompt information is used to prompt to enter the to-be-authenticated fingerprint information.

In the foregoing exemplary steps, the VR scene may display the authentication region, and the authentication region may display content that needs to be authenticated by the user. For example, the authentication region may display an amount needing to be paid by the user and authentication content needed in a payment process. The indication identifier may be generated by the fingerprint collection device in the VR scene. Herein, it should be noted that the present disclosure does not specifically limit a form of the indication identifier. For example, the indication identifier may be a mouse arrow or an indication line marking. A corresponding operation is performed on the fingerprint collection device in the physical scene, so that the indication identifier can be controlled to move in the VR scene, so that the indication identifier is directed to the authentication region. When the indication identifier is directed to the authentication region, the prompt information may be displayed in the VR scene. The prompt information may be used to prompt the user to enter the to-be-authenticated fingerprint information on the fingerprint collection device in the physical scene.

It should be noted that when the indication identifier generated by the fingerprint collection device in the VR scene is directed to the authentication region, it indicates that content displayed in the authentication region and needing user authentication is authenticated. Therefore, after the authentication request is received in the VR scene, it is first determined whether the indication identifier generated by the fingerprint collection device in the VR scene is directed to the authentication region, and if it is determined that the indication identifier is directed to the authentication region, it indicates that the user is to authenticate the content displayed in the authentication region and needing user authentication. In this case, the prompt information may be displayed in the VR scene, to prompt the user to enter the to-be-authenticated fingerprint information on the fingerprint collection device, and corresponding authentication is performed by using the to-be-authenticated fingerprint information.

It is determined whether the indication identifier generated by the fingerprint collection device in the VR scene is directed to the authentication region, so that the content needing user authentication can be determined intuitively in the VR scene, and an authentication target of the user is clearer. In addition, the prompt information is displayed in the VR scene when the indication identifier is directed to the authentication region, to prompt the user to enter the to-be-authenticated fingerprint information on the fingerprint collection device, so that the user can clearly an authentication operation process, improving both the use experience of the user and the authentication efficiency of the user.

In an optional embodiment, after performing S208 of receiving, in the VR scene, the authentication result information sent by the authenticator, further exemplary step may be performed as the following.

S212. When the authentication result information indicates that the to-be-authenticated fingerprint information has passed the authentication, executing, in the VR scene, a resource transfer event corresponding to the authentication region.

In the foregoing step, the authentication region may display content needing user authentication. When the content displayed in the authentication region and needing user authentication is an amount needing to be paid by the user and authentication content needed in a payment process, if the authentication result information obtained after the authenticator performs authentication indicates that the to-be-authenticated fingerprint information has passed the authentication, the resource transfer event corresponding to the authentication region may be executed in the VR scene. In other words, the amount needing to be paid by the user is transferred from a user account. In this case, no authentication system needs to be set up in the VR scene, and an authentication process in the VR scene is completed by using the fingerprint collection device and the authenticator in the physical scene. In this way, resource consumption caused by setting up the authentication system in the VR scene can be reduced, and the authentication efficiency in the VR scene can be improved.

In an optional embodiment, S206 of sending the to-be-authenticated fingerprint information to the authenticator in the physical scene may include the following S2062 and S2064. For example:

S2062. Sending, in the VR scene, a first timestamp to the authenticator, where the first timestamp is a time point at which the fingerprint collection device collects the to-be-authenticated fingerprint information.

In the foregoing step, the fingerprint collection device may collect fingerprint information entered by the user and may further record a time of collecting the fingerprint information. The time may exist in a form of a timestamp. The first timestamp may be a time point at which the fingerprint collection device collects the to-be-authenticated fingerprint information. The fingerprint collection device records the first timestamp when collecting the to-be-authenticated fingerprint information entered by the user and sends the collected to-be-authenticated fingerprint information and the first timestamp to the VR device together by using the communication connection between the fingerprint collection device and the VR device. After receiving the to-be-authenticated fingerprint information and the first timestamp, the VR device may send the to-be-authenticated fingerprint information and the first timestamp to the authenticator by using the communication connection between the VR device and the authenticator, so that the authenticator performs authentication.

S2064. Sending the to-be-authenticated fingerprint information and a second timestamp to the authenticator by using the fingerprint collection device and a communication terminal device, where the second timestamp is a time point at which the fingerprint collection device collects the to-be-authenticated fingerprint information, the fingerprint collection device performs data transmission with the communication terminal device by using an established connection to the communication terminal device, and the first timestamp and the second timestamp are used by the authenticator to authenticate the to-be-authenticated fingerprint information.

The present disclosure does not specifically limit a type of the communication terminal device. For example, the communication terminal device may be a mobile phone or a computer. The fingerprint collection device may be in communication connection with the communication terminal device. The communication connection may be wired connection or wireless connection. In this manner, the fingerprint collection device is in wireless connection to the fingerprint collection device, for example, via Bluetooth or WiFi. The fingerprint collection device may send the collected to-be-authenticated fingerprint information and the second timestamp to the communication terminal device by using the wireless connection between the fingerprint collection device and the communication terminal device. The second timestamp may be the time point at which the fingerprint collection device collects the to-be-authenticated fingerprint information. The communication terminal device may be in communication connection to the authenticator. The communication connection may be wired connection or wireless connection. This is not specifically limited in the present disclosure.

After receiving the to-be-authenticated fingerprint information and the second timestamp, the communication terminal device may send the to-be-authenticated fingerprint information and the second timestamp to the authenticator by using the communication connection between the communication terminal device and the authenticator, so that the authenticator performs authentication. Herein, it should be noted that the fingerprint information pre-stored in the authenticator may be reported to the authenticator by the fingerprint collection device by using the communication terminal device after the fingerprint collection device collects the fingerprint information. In addition, when reporting the fingerprint information, the fingerprint collection device also reports a time point, in other words, a timestamp, of collecting the fingerprint information to the authenticator. The authenticator may store the fingerprint information, the timestamp, and a correspondence to the information about the user.

It should be noted that, the authenticator may perform further authentication by using the first timestamp and the second timestamp when authenticating the to-be-authenticated fingerprint information, in other words, authenticate whether the first timestamp matches the second timestamp. In this way, an effect of improving the authentication accuracy of the authenticator can be achieved.

In an optional embodiment, S208 of receiving, in the VR scene, the authentication result information sent by the authenticator may further include the following exemplary steps:

S2082. When the authenticator determines that the first timestamp matches the second timestamp, and fingerprint information matched with the to-be-authenticated fingerprint information exists in a fingerprint database, receiving, in the VR scene, first authentication result information sent by the authenticator, where the first authentication result information is used to indicate that the to-be-authenticated fingerprint information has passed the authentication.

S2084. When the authenticator determines that the first timestamp does not match the second timestamp, and no fingerprint information matched with the to-be-authenticated fingerprint information exists in a fingerprint database, receiving, in the VR scene, second authentication result information sent by the authenticator, where the second authentication result information is used to indicate that the to-be-authenticated fingerprint information has unpassed the authentication.

In the foregoing steps, the authentication process of the authenticator may include: determining whether the first timestamp matches the second timestamp, and whether fingerprint information matched with the to-be-authenticated fingerprint information exists in the fingerprint database. The fingerprint database may be a database used by the authenticator to store fingerprint information. After performing the foregoing authentication, if determining that the first timestamp matches the second timestamp, and the fingerprint information matched with the to-be-authenticated fingerprint information exists in the fingerprint database, the authenticator may send the first authentication result information to the VR device, and the first authentication result information may be used to indicate that the to-be-authenticated fingerprint information has passed the authentication;

and if determining that the first timestamp does not match the second timestamp, or no fingerprint information matched with the to-be-authenticated fingerprint information exists in the fingerprint database, or determining that the first timestamp does not match the second timestamp, and no fingerprint information matched with the to-be-authenticated fingerprint information exists in the fingerprint database, the authenticator may send the second authentication result information to the VR device, and the second authentication result information may be used to indicate that the to-be-authenticated fingerprint information has unpassed the authentication.

The authenticator needs to authenticate whether the first timestamp matches the second timestamp when authenticating whether the fingerprint information matched with the to-be-authenticated fingerprint information exists in the fingerprint database, a multi-authentication mechanism can greatly improve the authentication accuracy of the authenticator. In addition, after determining an authentication result, the authenticator feeds back the authentication result to the VR device in time and the authentication result is displayed in the VR scene, so that the user can clearly and intuitively know the authentication result, further improving the use experience of the user.

The present disclosure further provides an exemplary embodiment described by using payment authentication in a VR scene as an example. It should be noted that the applicable scenario, namely, the payment authentication in the VR scene, is merely an exemplary embodiment of the present disclosure. This exemplary embodiment of the present disclosure may further be applied to a scenario including, for example, authority authentication in the VR scene.

Figure 3:
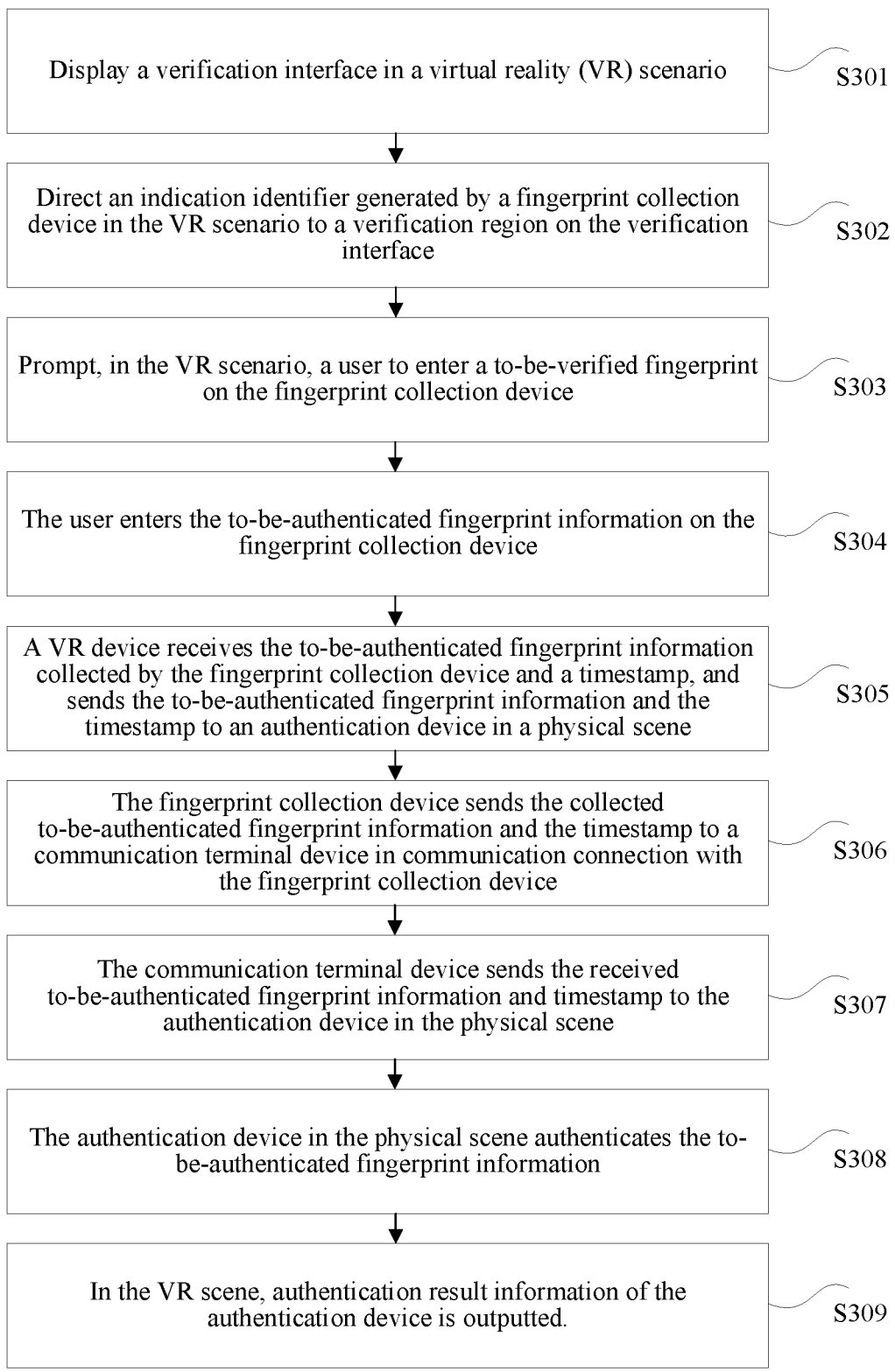
FIG. 3 is a flowchart of a VR scene-based authentication method according to an exemplary embodiment of the present disclosure.

FIG. 3 is a flowchart of an optional VR scene-based authentication method according to the exemplary embodiment of the present disclosure. As shown in FIG. 3, the exemplary embodiment may include the following exemplary steps.

S301. Display an authentication interface in the VR scene.

Figure 4:
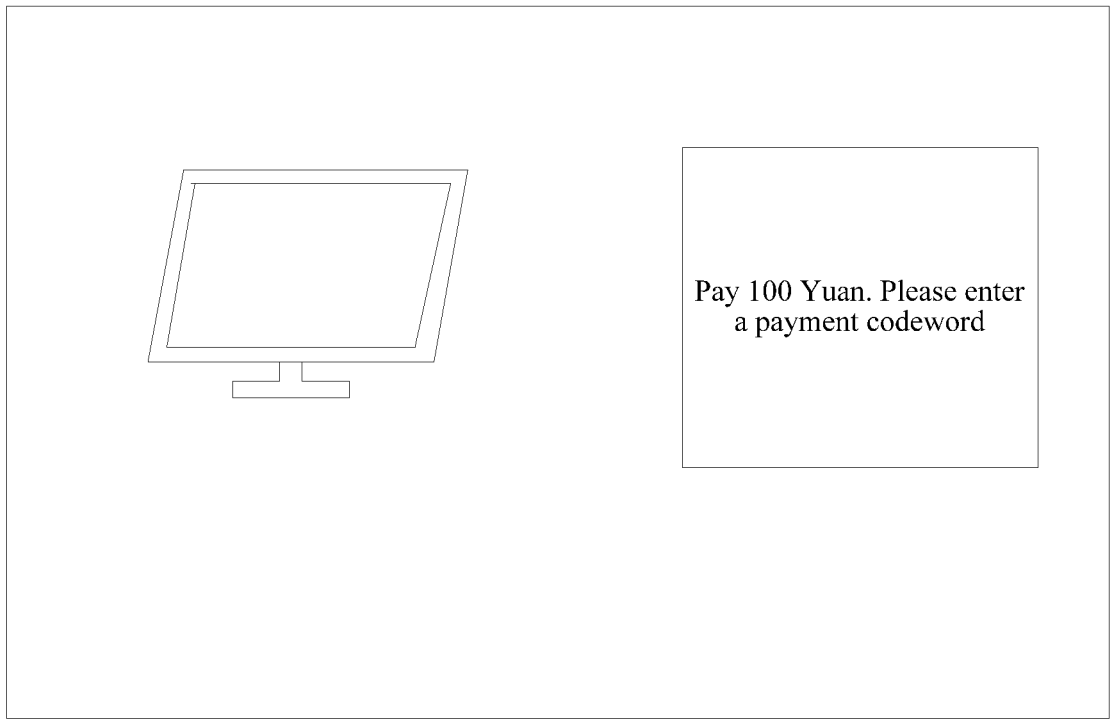
FIG. 4 is a schematic diagram of an authentication interface in a VR scene according to an exemplary embodiment of the present disclosure.

The authentication interface may be used to instruct the user to perform payment authentication. The authentication interface in the VR scene may be shown in FIG. 4. As shown in FIG. 4, the authentication interface may display content of payment authentication. For example, the authentication interface displays "Pay 100 Yuan. Please enter a payment codeword". The VR scene shown in FIG. 4 may further display other content, for example, a computer shown in FIG. 4. Herein, FIG. 4 is merely a schematic diagram of the VR scene, but does not show all content in the VR scene. After viewing the content on the authentication interface in the VR scene, the user may perform a payment authentication process.

S302. Direct an indication identifier generated by a fingerprint collection device in the VR scene to an authentication region on the authentication interface.

Figure 5:
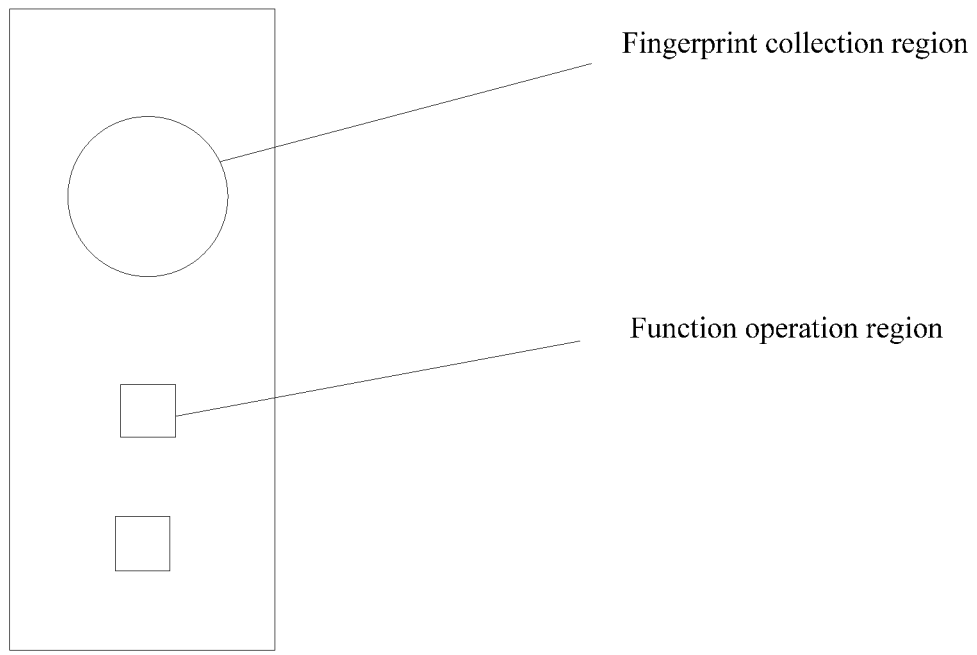
FIG. 5 is a schematic structural diagram of a fingerprint collection device according to an exemplary embodiment of the present disclosure.
Figure 6:
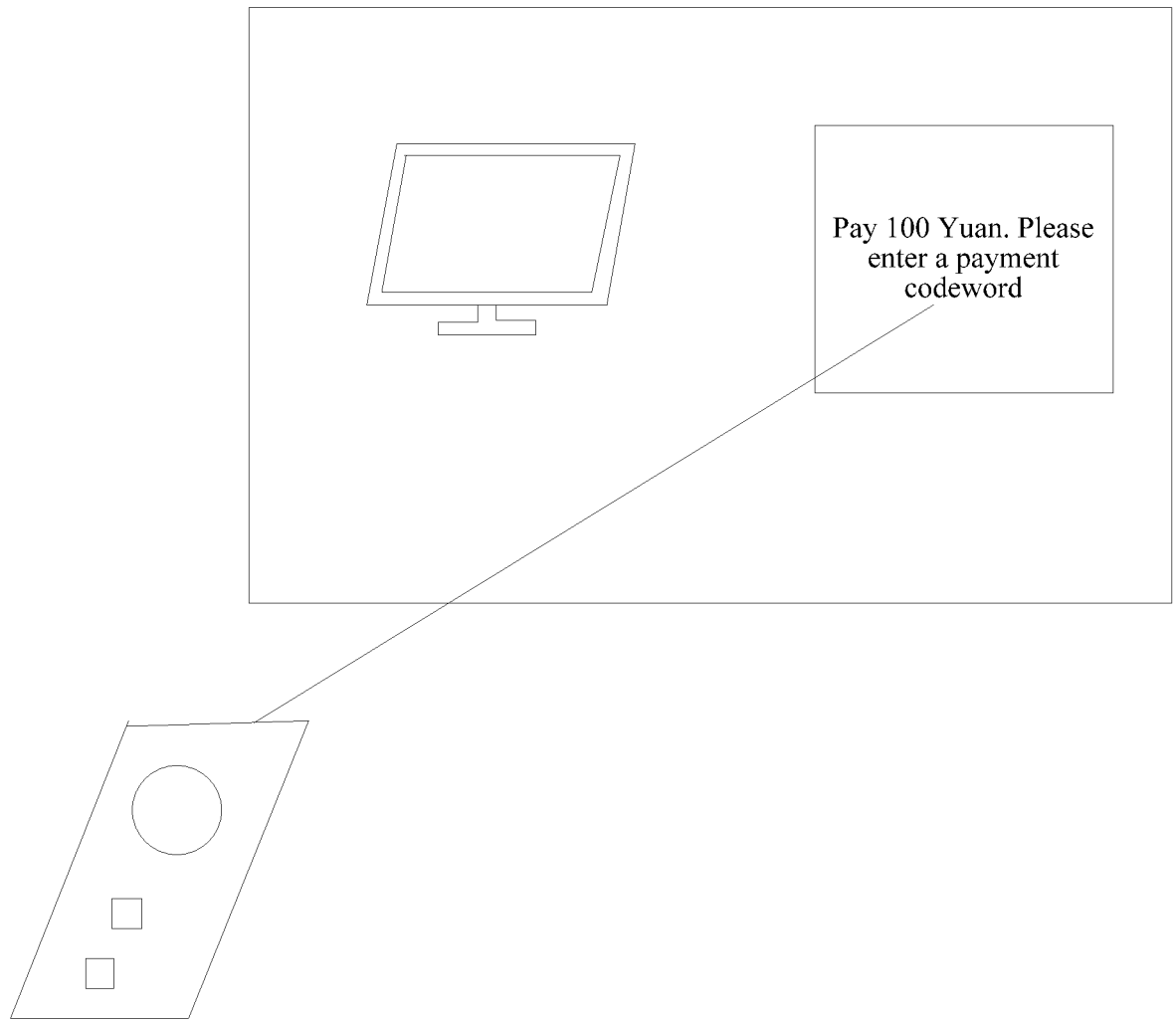
FIG. 6 is a schematic diagram showing that an indication identifier is directed to an authentication region according to an exemplary embodiment of the present disclosure.

This exemplary step is used to instruct to authenticate authentication content indicated in the authentication region. It should be noted that a structure of the fingerprint collection device in a physical scene may be shown in FIG. 5. A fingerprint collection region and a corresponding function operation region may be disposed in the fingerprint collection device, for example, a game function key. In the VR scene shown in FIG. 4, the fingerprint collection device controls the indication identifier to be directed to the authentication region, as may be shown in FIG. 6. An indication line in FIG. 6 is used to represent that the indication identifier generated by the fingerprint collection device in the VR scene is directed to the authentication region in the VR scene.

S303. In the VR scene, a user is prompted to enter a to-be-authenticated fingerprint information on the fingerprint collection device.

When the indication identifier is directed to the authentication region, the prompt information may be displayed in the VR scene. The prompt information may be used to prompt the user to enter the to-be-authenticated fingerprint information on the fingerprint collection device.

S304. The user enters the to-be-authenticated fingerprint information on the fingerprint collection device. It should be noted that when collecting the to-be-authenticated fingerprint information, the fingerprint collection device may further record a time of collecting the to-be-authenticated fingerprint information. The time may be recorded in a form of a timestamp.

S305. A VR device may receive the to-be-authenticated fingerprint information collected by the fingerprint collection device and the timestamp, and send the to-be-authenticated fingerprint information and the timestamp to an authenticator in a physical scene.

It should be noted that the authenticator in the physical scene may be Alipay, a bank payment platform, or the like.

S306. The fingerprint collection device may send the collected to-be-authenticated fingerprint information and the timestamp to a communication terminal device in communication connection with the fingerprint collection device.

For example, the communication terminal device may be a mobile phone or a computer, and the communication connection may be Bluetooth or WiFi.

S307. The communication terminal device may send the received to-be-authenticated fingerprint information and timestamp to the authenticator in the physical scene.

This exemplary is used by the authenticator to authenticate, according to the information, the to-be-authenticated fingerprint information and the timestamp that are sent by the VR device.

S308. The authenticator in the physical scene authenticates the to-be-authenticated fingerprint information.

The authenticator may authenticate, according to the to-be-authenticated fingerprint information and the timestamp that are sent by the communication terminal, the to-be-authenticated fingerprint information and the timestamp that are sent by the VR device. For example, an authentication process performed by the authenticator may include: determining whether the timestamp sent by the VR device matches the timestamp sent by the communication terminal device; and determining whether fingerprint information the same as the to-be-authenticated fingerprint information sent by the VR device exists in a fingerprint database. Fingerprint information stored in the fingerprint database may be fingerprint information collected by the fingerprint collection device in the physical scene and sent by the communication terminal device. If a determining result of either of the foregoing authentication steps is negative, the authenticator determines that the to-be-authenticated fingerprint information has unpassed the authentication; or if determining result of both of the foregoing authentication steps are positive, the authenticator determines that the to-be-authenticated fingerprint information has passed the authentication.

S309. In the VR scene, authentication result information of the authenticator is outputted.

Figure 7:
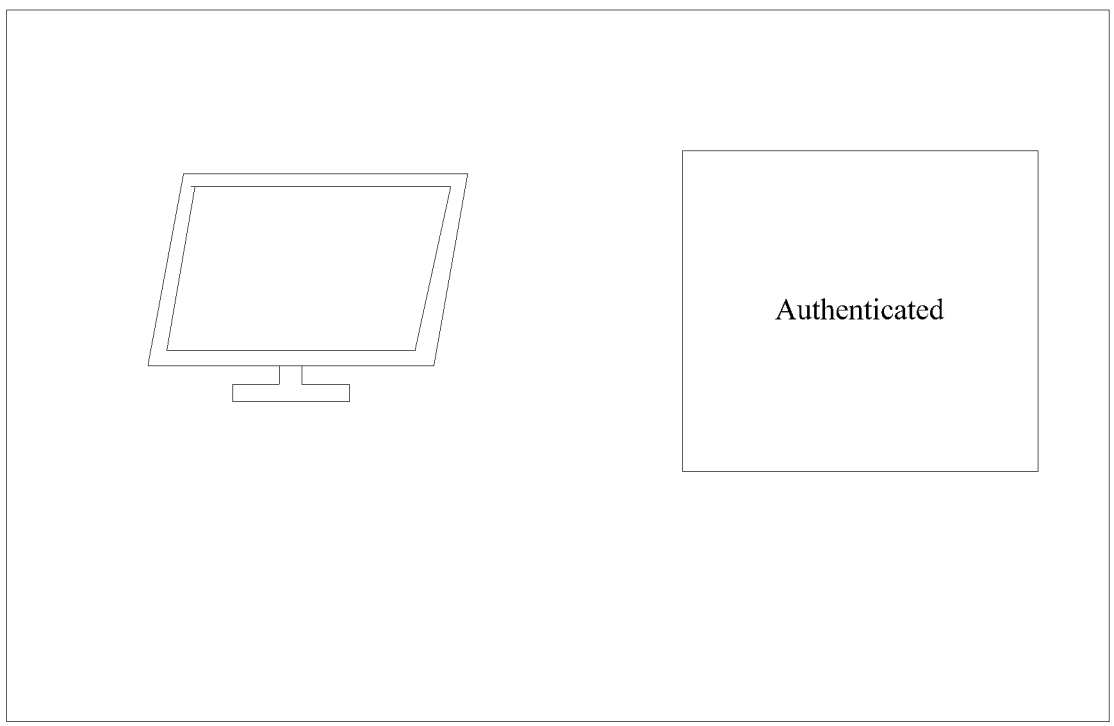
FIG. 7 is a schematic diagram of displaying authentication result information in a VR scene according to an exemplary embodiment of the present disclosure.

The authentication result information is the to-be-authenticated fingerprint information has passed the authentication or the to-be-authenticated fingerprint information has unpassed the authentication. The authentication result information may be displayed in the VR scene as shown in FIG. 7. The authentication result information displayed in FIG. 7 is "Authenticated".

In an exemplary embodiment, no authentication system needs to be set up in the VR scene, and the VR device, for example, a helmet-mounted display or light-valve glasses, may exchange data with the fingerprint collection device and the authenticator in the physical scene, to implement payment authentication in the VR scene.

Figure 8:
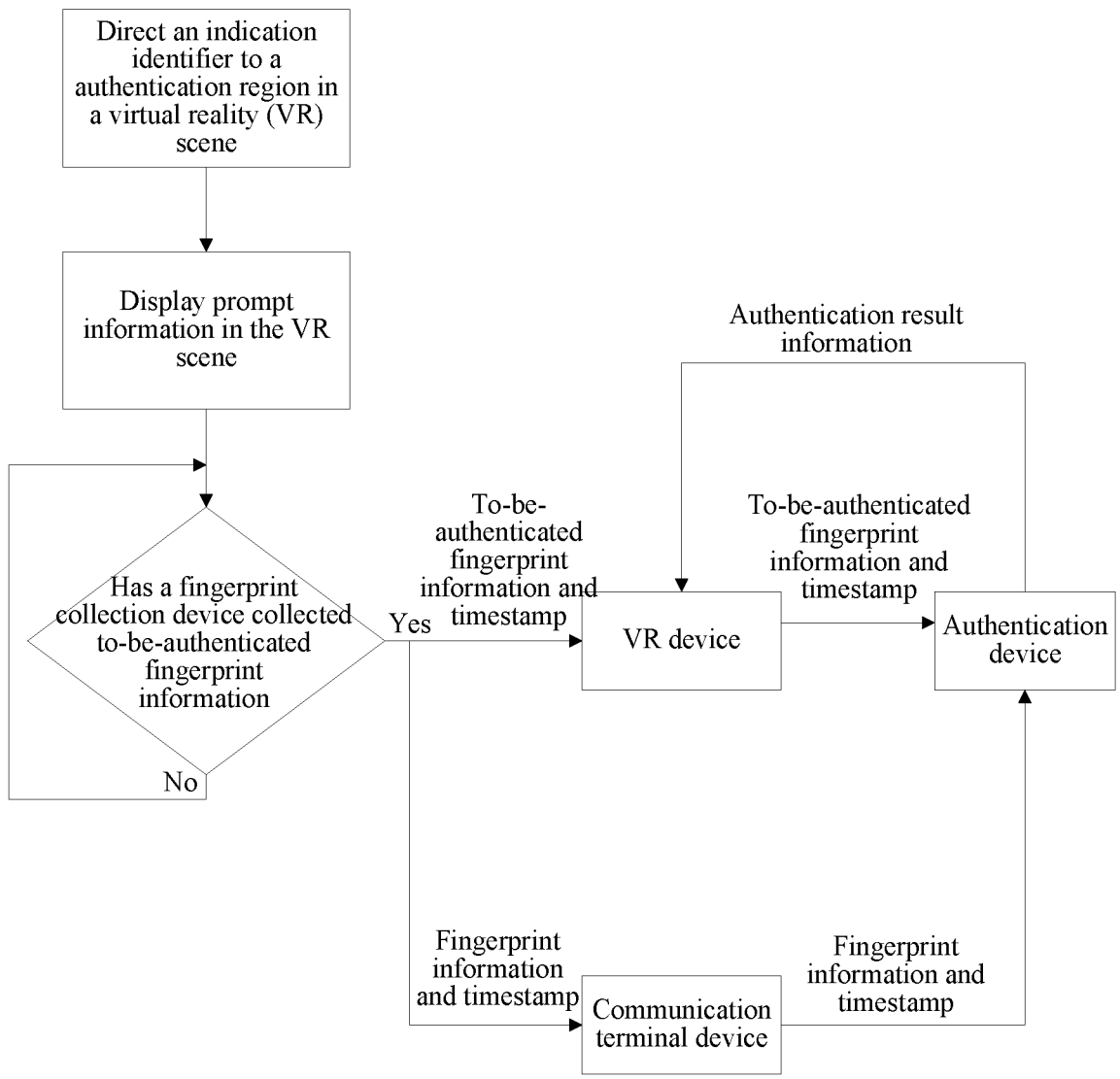
FIG. 8 is a schematic diagram of a data exchange process between a VR scene and a physical scene according to an exemplary embodiment of the present disclosure.

FIG. 8 is a schematic diagram of a data exchange process between the VR scene and physical scene according to the exemplary embodiment of the present disclosure. As shown in FIG. 8, the data exchange process between the VR device, the fingerprint collection device, and the authenticator For example includes: directing the indication identifier generated by the fingerprint collection device in the VR scene to the authentication region in the VR scene; displaying the prompt information in the VR scene, to prompt the user to enter the to-be-authenticated fingerprint information on the fingerprint collection device; when collecting the to-be-authenticated fingerprint information, sending, by the fingerprint collection device, the collected to-be-authenticated fingerprint information and the time point at which the to-be-authenticated fingerprint information is collected and that is in a form of a timestamp to the VR device; and sending, by the VR device, the received the to-be-authenticated fingerprint information and the corresponding timestamp to the authenticator in the physical scene for authentication.

It should be noted that when collecting fingerprint information, the fingerprint collection device may send the collected fingerprint information and a corresponding timestamp to the communication terminal device, for example, a mobile phone or a computer, in communication connection with the fingerprint collection device. The communication terminal device may send the fingerprint information collected by the fingerprint collection device and the corresponding timestamp to the authenticator, so that the authenticator stores them in the fingerprint database. After receiving the to-be-authenticated fingerprint information and the corresponding timestamp that are sent by the VR device, the authenticator may authenticate the to-be-authenticated fingerprint information according to information stored in the fingerprint database, and feed back the authentication result information to the VR device; and if the to-be-authenticated fingerprint information has passed the authentication, the authenticator returns, to the VR device, information indicating that the to-be-authenticated fingerprint information has passed the authentication; or if the to-be-authenticated fingerprint information has unpassed the authentication, the authenticator outputs, to the VR scene, indication information indicating that the user indicates that the to-be-authenticated fingerprint information has unpassed the authentication.

As such, by using the data exchange process between the VR device and the fingerprint collection device and the authenticator in the physical scene, payment authentication can be implemented without setting up a payment authentication system in the VR scene, thereby implementing the technical effect of improving the payment efficiency in the VR scene. Technical problems in the related technology that a payment authentication system must be set up for making payments in a VR scene, resulting low efficiency in making the payments in the VR scene can be solved.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are example embodiments, and the related actions and modules are not necessarily mandatory to the present disclosure.

Through the descriptions of the implementations, a person skilled in the art may clearly understand that the method in the foregoing embodiment may be implemented by software plus a necessary general hardware platform, and certainly may be implemented by hardware. However, in many cases, the former is an exemplary implementation. Based on such an understanding, the technical solutions of the present disclosure essentially, or the part contributing to the existing technology may be implemented in the form of a software product. The software product is stored in a storage medium and includes several instructions for instructing a terminal device (which may be a mobile phone, a computer, a server, a network device, or the like) to perform all or a part of the steps of the methods described in the embodiments of the present disclosure.

Exemplary Embodiment 2

Figure 9:
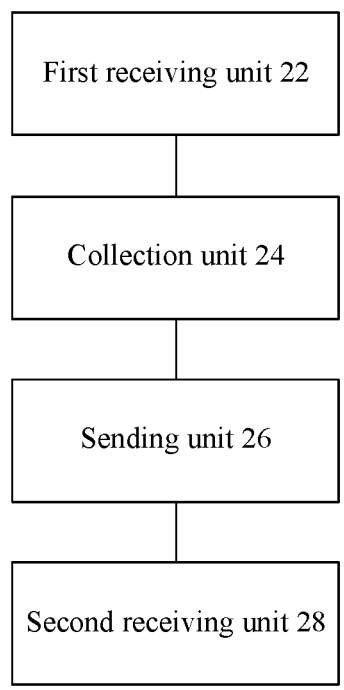
FIG. 9 is a schematic diagram of an optional VR scene-based authentication apparatus according to an exemplary embodiment of the present disclosure.

VR scene-based authentication apparatus are configured to implement the VR scene-based authentication methods. It should be noted that the VR scene-based authentication apparatus may be applied to the VR device in the present disclosure. FIG. 9 is a schematic diagram of an optional VR scene-based authentication apparatus according to the embodiments of the present disclosure. As shown in FIG. 9, the apparatus may include:

a first receiving unit 22, configured to receive an authentication request in a VR scene; a collection unit 24, configured to collect to-be-authenticated fingerprint information by using a fingerprint collection device in a physical scene; a sending unit 26, configured to send the to-be-authenticated fingerprint information to an authenticator in the physical scene; and a second receiving unit 28, configured to receive, in the VR scene, authentication result information sent by the authenticator, where the authentication result information is used to indicate whether the to-be-authenticated fingerprint information has passed the authentication or not.

It should be noted that the first receiving unit 22 may be configured to perform S202 in the exemplary Embodiment 1 of the present disclosure, the collection unit 24 may be configured to perform S204 in exemplary Embodiment 1 of the present disclosure, the sending unit 26 may be configured to perform S206 in exemplary Embodiment 1 of the present disclosure, and the second receiving unit 28 may be configured to perform S208 in the exemplary Embodiment 1 of the present disclosure.

Herein, it should be noted that implemented examples and the application scenario of the modules are the same as those of the corresponding steps, but are not limited to the content disclosed in the exemplary Embodiment 1. It should be noted that the modules, as a part of the apparatus, may run in the hardware environment shown in FIG. 1, and may be implemented by software and/or hardware.

Figure 10:
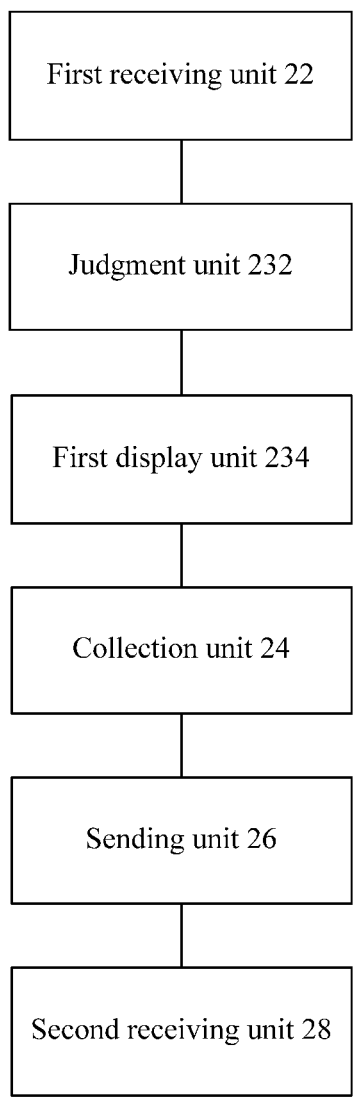
FIG. 10 is a schematic diagram of another optional VR scene-based authentication apparatus according to an exemplary embodiment of the present disclosure.

In an optional embodiment, as shown in FIG. 10, the optional VR scene-based authentication apparatus may further include a judgment unit 232, configured to: after the authentication request is received in the VR scene, and before the to-be-authenticated fingerprint information is collected by using the fingerprint collection device in the physical scene, determine whether an indication identifier is directed to an authentication region in the VR scene, where the indication identifier is generated by the fingerprint collection device in the VR scene; and a first display unit 234, configured to: when it is determined that the indication identifier is directed to the authentication region, display prompt information in the VR scene, where the prompt information is used to prompt to enter the to-be-authenticated fingerprint information.

It should be noted that the judgment unit 232 may be configured to perform S2032 in the exemplary Embodiment 1 of the present disclosure, and the first display unit 234 may be configured to perform S2034 in the exemplary Embodiment 1 of the present disclosure.

Herein, it should be noted that implemented examples and the application scenario of the modules are the same as those of the corresponding steps, but are not limited to the content disclosed in Embodiment 1. It should be noted that the modules, as a part of the apparatus, may run in the hardware environment shown in FIG. 1, and may be implemented by software, or hardware.

Figure 11:
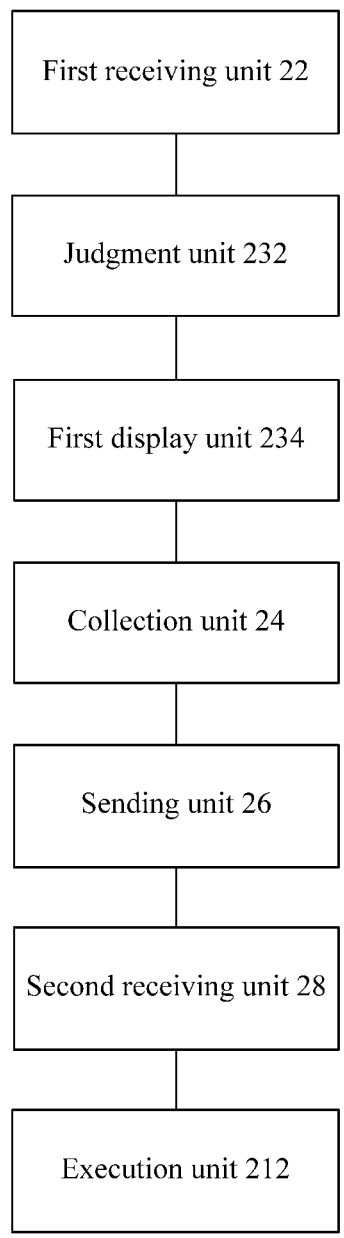
FIG. 11 is a schematic diagram of another optional VR scene-based authentication apparatus according to an exemplary embodiment of the present disclosure.

In an optional embodiment, as shown in FIG. 11, the optional VR scene-based authentication apparatus may further include an execution unit 212, configured to after the authentication result information sent by the authenticator is received in the VR scene, and when the authentication result information indicates that the to-be-authenticated fingerprint information has passed the authentication, execute, in the VR scene, a resource transfer event corresponding to the authentication region.

It should be noted that the execution unit 212 may be configured to perform S212 in the exemplary Embodiment 1 of the present disclosure.

Herein, it should be noted that implemented examples and the application scenario of the modules are the same as those of the corresponding steps, but are not limited to the content disclosed in the exemplary Embodiment 1. It should be noted that the modules, as a part of the apparatus, may run in the hardware environment shown in FIG. 1, and may be implemented by software, or hardware.

Figure 12:
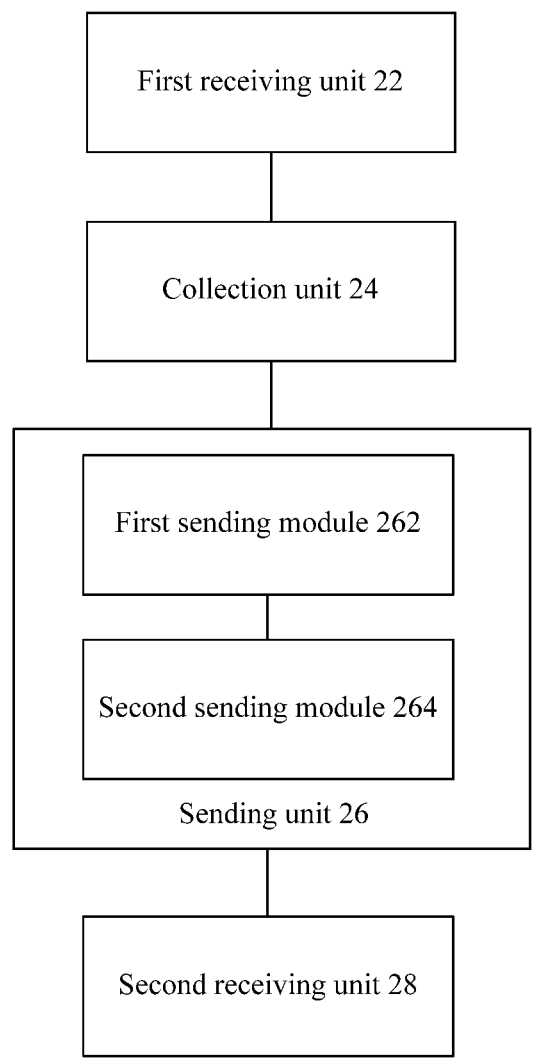
FIG. 12 is a schematic diagram of another optional VR scene-based authentication apparatus according to an exemplary embodiment of the present disclosure.

In an optional embodiment, as shown in FIG. 12, the sending unit 26 may include a first sending module 262, configured to send, from the VR scene, a first timestamp to the authenticator, where the first timestamp is a time point at which the fingerprint collection device collects the to-be-authenticated fingerprint information; a second sending module 264, configured to send the to-be-authenticated fingerprint information and a second timestamp to the authenticator by using the fingerprint collection device and a communication terminal device, where the second timestamp is a time point at which the fingerprint collection device collects the to-be-authenticated fingerprint information, the fingerprint collection device performs data transmission with the communication terminal device by using an established connection to the communication terminal device, and the first timestamp and the second timestamp are used by the authenticator to authenticate the to-be-authenticated fingerprint information.

It should be noted that the first sending module 262 may be configured to perform S2062 in the exemplary Embodiment 1 of the present disclosure, and the second sending module 264 may be configured to perform S2064 in the exemplary Embodiment 1 of the present disclosure.

Herein, it should be noted that implemented examples and the application scenario of the modules are the same as those of the corresponding steps, but are not limited to the content disclosed in the exemplary Embodiment 1. It should be noted that the modules, as a part of the apparatus, may run in the hardware environment shown in FIG. 1, and may be implemented by software, or hardware.

Figure 13:
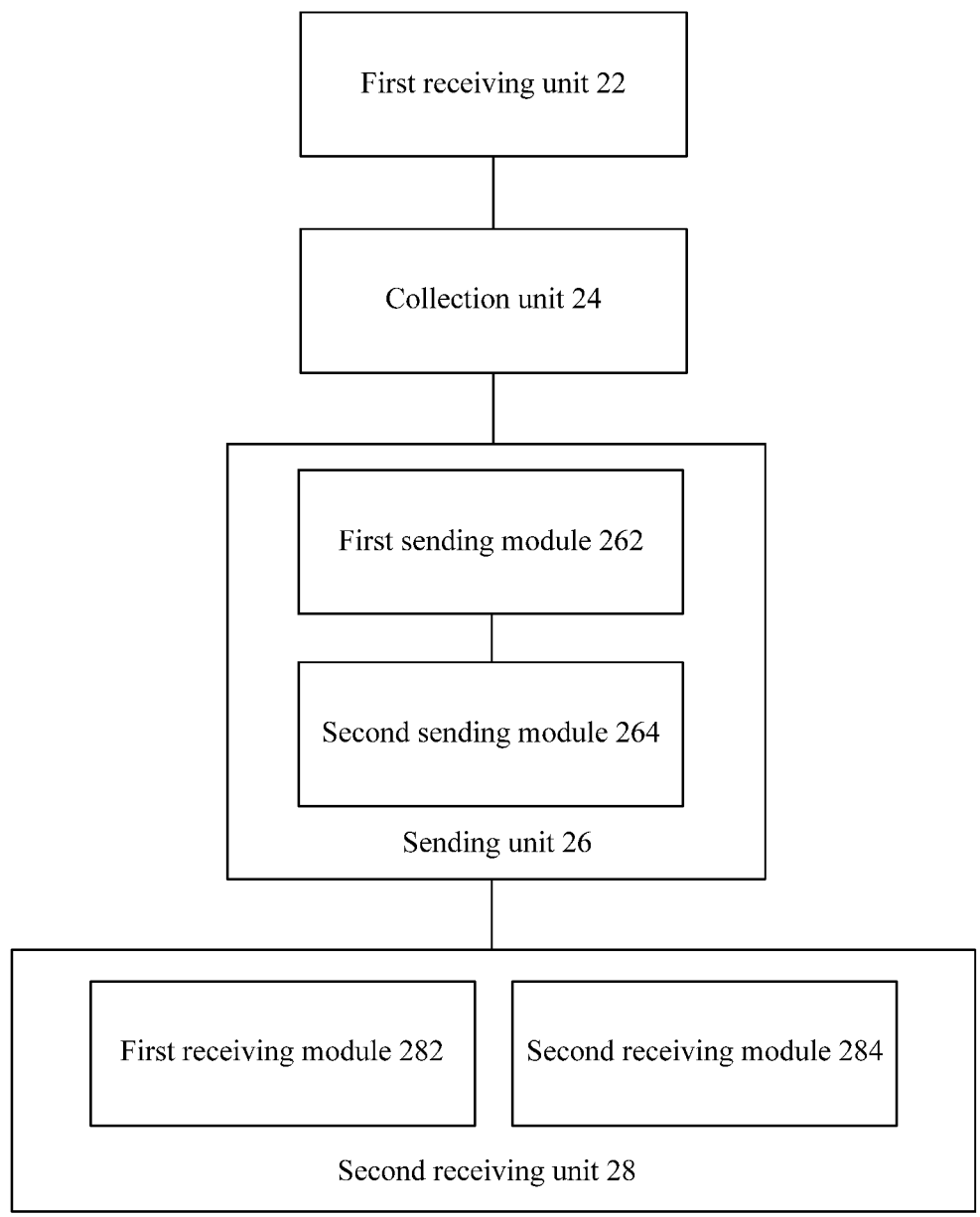
FIG. 13 is a schematic diagram of another optional VR scene-based authentication apparatus according to an exemplary embodiment of the present disclosure.

In an optional embodiment, as shown in FIG. 13, the second receiving unit 28 may include a first receiving module 282, configured to: when the authenticator determines that the first timestamp matches the second timestamp, and fingerprint information matched with the to-be-authenticated fingerprint information exists in a fingerprint database, receive, in the VR scene, first authentication result information sent by the authenticator, where the first authentication result information is used to indicate that the to-be-authenticated fingerprint information has passed the authentication; and a second receiving module 284, configured to: when the authenticator determines that the first timestamp does not match the second timestamp, and/or no fingerprint information matched with the to-be-authenticated fingerprint information exists in the fingerprint database, receive, in the VR scene, second authentication result information sent by the authenticator, where the second authentication result information is used to indicate that the to-be-authenticated fingerprint information has unpassed the authentication.

It should be noted that the first receiving module 282 may be configured to perform S2082 in the exemplary Embodiment 1 of the present disclosure, and the second receiving module 284 may be configured to perform S2084 in the exemplary Embodiment 1 of the present disclosure.

Herein, it should be noted that implemented examples and the application scenario of the modules are the same as those of the corresponding steps, but are not limited to the content disclosed in the exemplary Embodiment 1. It should be noted that the modules, as a part of the apparatus, may run in the hardware environment shown in FIG. 1, and may be implemented by software, or hardware.

Figure 14:
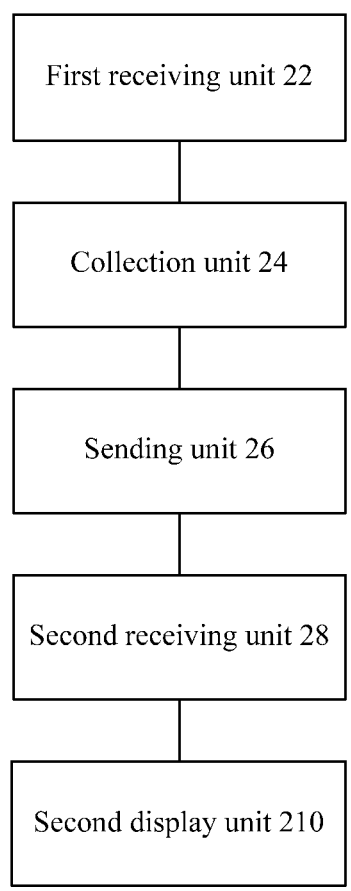
FIG. 14 is a schematic diagram of another optional VR scene-based authentication apparatus according to an exemplary embodiment of the present disclosure.

In an optional embodiment, as shown in FIG. 14, the optional VR scene-based authentication apparatus may further include a second display unit 210, configured to: after the authentication result information sent by the authenticator is received in the VR scene, display the authentication result information in the VR scene.

It should be noted that the second display unit 212 may be configured to perform S210 in the exemplary Embodiment 1 of the present disclosure.

Herein, it should be noted that implemented examples and the application scenario of the modules are the same as those of the corresponding steps, but are not limited to the content disclosed in the exemplary Embodiment 1. It should be noted that the modules, as a part of the apparatus, may run in the hardware environment shown in FIG. 1, and may be implemented by software, or hardware.

By using the foregoing modules, payment authentication can be implemented without setting up a payment authentication system in the VR scene, thereby implementing the technical effect of improving the payment efficiency in the VR scene. Further, technical problems in the related technology that a payment authentication system must be set up for making payments in a VR scene, resulting low efficiency in making the payments in the VR scene, can be solved as disclosed herein.

Exemplary Embodiment 3

A server or a terminal are provided and configured to implement the VR scene-based authentication methods. It should be noted that the server or the terminal may be applied to the VR device in the present disclosure. The VR device may present a VR scene, and the VR device may be configured to perform the steps in the exemplary Embodiment 1, to implement authentication in the VR scene.

Figure 15:
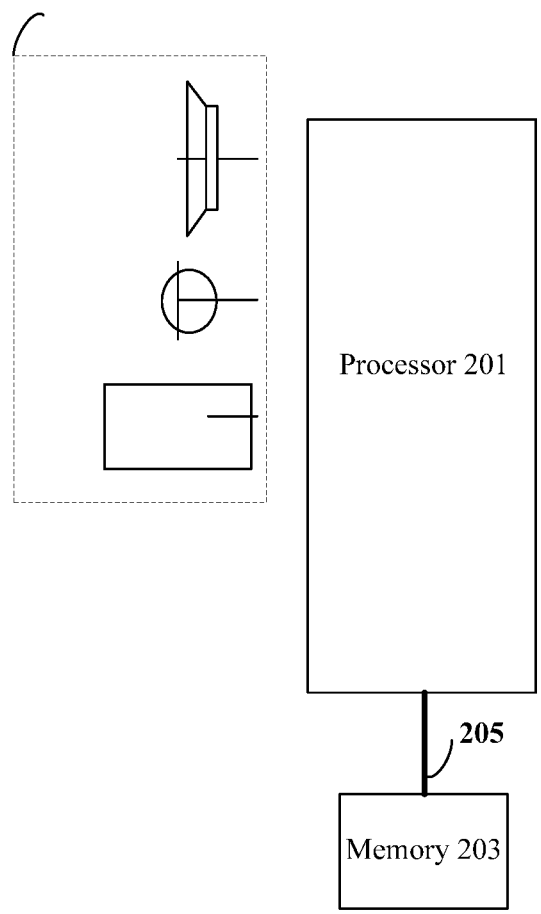
FIG. 15 is a structural block diagram of a terminal according to an exemplary embodiment of the present disclosure.

FIG. 15 is a structural block diagram of the terminal according to the exemplary embodiment of the present disclosure. As shown in FIG. 15, the terminal may include one or more (only one is shown in the figure) processors 201, a memory 203, and a transmission apparatus 205. As shown in FIG. 15, the terminal may further include an input/output device 207.

The memory 203 may be configured to store program instructions and a module, for example, a program instruction/module corresponding to the VR scene-based authentication method and apparatus in the embodiments of the present disclosure. The processor 201 runs the program instructions and module stored in the memory 203, to perform various function applications and data processing, in other words, implement the VR scene-based authentication method. The memory 203 may include a high-speed random access memory (RAM), or may include a non-volatile memory, for example, one or more magnetic storage apparatuses, a flash memory, or another non-volatile solid-state memory. In some examples, the memory 203 may further include a memory remotely disposed relative to the processor 201, and the remote memory may be connected to the terminal through a network. Examples of the network include but are not limited to Internet, Intranet, a local area network, a mobile communications network, and a combination thereof.

The transmission apparatus 205 is configured to receive or send data through a network, and may be further configured to perform data transmission between the processor and the memory. Specific examples of the network may include a wired network and a wireless network. In an example, the transmission apparatus 205 includes a network interface controller (NIC), and may be connected to another network device and a router by using a network cable, to communicate with the Internet or the local area network. In an example, the transmission apparatus 205 is a radio frequency (RF) module, and is configured to communicate with the Internet in a wireless manner.

For example, the memory 203 is configured to store an application program (or program instructions).

The processor 201 may invoke, by using the transmission apparatus 205, the application program stored in the memory 203, to perform the following exemplary steps: receiving an authentication request in a VR scene; collecting to-be-authenticated fingerprint information by using a fingerprint collection device in a physical scene; sending the to-be-authenticated fingerprint information to an authenticator in the physical scene; and receiving, in the VR scene, authentication result information sent by the authenticator, where the authentication result information is used to indicate whether the to-be-authenticated fingerprint information has passed the authentication or not.

The processor 201 is further configured to perform the following exemplary steps: after the authentication request is received in the VR scene, and before the to-be-authenticated fingerprint information is collected by using the fingerprint collection device in the physical scene, determining whether an indication identifier is directed to an authentication region in the VR scene, where the indication identifier is generated by the fingerprint collection device in the VR scene; and when it is determined that the indication identifier is directed to the authentication region, displaying prompt information in the VR scene, where the prompt information is used to prompt to enter the to-be-authenticated fingerprint information.

The processor 201 is further configured to perform the following step: after the authentication result information sent by the authenticator is received in the VR scene, and when the authentication result information indicates that the to-be-authenticated fingerprint information has passed the authentication, executing, in the VR scene, a resource transfer event corresponding to the authentication region.

The processor 201 is further configured to perform the following exemplary steps: sending, from the VR scene, a first timestamp to the authenticator, where the first timestamp is a time point at which the fingerprint collection device collects the to-be-authenticated fingerprint information; and sending the to-be-authenticated fingerprint information and a second timestamp to the authenticator by using the fingerprint collection device and a communication terminal device, where the second timestamp is a time point at which the fingerprint collection device collects the to-be-authenticated fingerprint information, the fingerprint collection device performs data transmission with the communication terminal device by using an established connection to the communication terminal device, and the first timestamp and the second timestamp are used by the authenticator to authenticate the to-be-authenticated fingerprint information.

The processor 201 is further configured to perform the following exemplary steps: when the authenticator determines that the first timestamp matches the second timestamp, and fingerprint information matched with the to-be-authenticated fingerprint information exists in a fingerprint database, receiving, in the VR scene, first authentication result information sent by the authenticator, where the first authentication result information is used to indicate that the to-be-authenticated fingerprint information has passed the authentication; and when the authenticator determines that the first timestamp does not match the second timestamp, and/or no fingerprint information matched with the to-be-authenticated fingerprint information exists in the fingerprint database, receiving, in the VR scene, second authentication result information sent by the authenticator, where the second authentication result information is used to indicate that the to-be-authenticated fingerprint information has unpassed the authentication.

The processor 201 is further configured to perform the following step: after the authentication result information sent by the authenticator is received in the VR scene, displaying the authentication result information in the VR scene.

The present disclosure provides a VR scene-based authentication solution. When the authentication request is received in the VR scene, the to-be-authenticated fingerprint information collected by the fingerprint collection device in the physical scene is sent to the authenticator in the physical scene for authentication, so that payment authentication can be implemented without setting up a payment authentication system in the VR scene, thereby achieving a technical effect of improving the payment efficiency in the VR scene. Technical problems in the related technology that a payment authentication system must be set up for making payments in a VR scene, resulting low efficiency in making the payments in the VR scene, may thus be solved.

Optionally, for specific examples in this embodiment, refer to the examples described in the exemplary Embodiment 1 and Embodiment 2, and details are not repeated herein.

A person of ordinary skill in the art may understand that the structure shown in FIG. 15 is merely exemplary, and the terminal may be a terminal device, for example, a helmet-mounted display or light-valve glasses, capable of presenting the VR scene. FIG. 15 does not limit the structure of the foregoing electronic apparatus. For example, the terminal may further include more or fewer components (for example, a network interface, and a display apparatus) than those shown in FIG. 15, or have a configuration different from that shown in FIG. 15.

A person of ordinary skill in the art may understand that all or some of the steps of the methods in the embodiments may be implemented by a program instructing relevant hardware of the terminal device. The program instructions may be stored in a computer readable storage medium. The storage medium may include a flash memory, a read-only memory (ROM), a RAM, a magnetic disk, and an optical disc.

Exemplary Embodiment 4

The present disclosure further provides a storage medium, such as a non-transitory computer-readable storage medium. Optionally, the storage medium may be configured to execute program instructions/program code used for performing the VR scene-based authentication method. It should be noted that the storage medium may be applied to the VR device in the present disclosure, for example, a helmet-mounted display or light-valve glasses. The VR device may perform the VR scene-based authentication methods in the present disclosure using the disclosed storage medium, to implement authentication in the VR scene.

Optionally, the storage medium is configured to store program instructions/code used for performing the following exemplary steps:

S1. Receiving an authentication request in a VR scene.

S2. Collecting to-be-authenticated fingerprint information by using a fingerprint collection device in a physical scene.

S3. Sending the to-be-authenticated fingerprint information to an authenticator in the physical scene.

S4. Receiving, in the VR scene, authentication result information sent by the authenticator, the authentication result information being used to indicate whether the to-be-authenticated fingerprint information has passed the authentication.

Optionally, the storage medium is further configured to store program code used for performing the following exemplary steps: after the authentication request is received in the VR scene, and before the to-be-authenticated fingerprint information is collected by using the fingerprint collection device in the physical scene, determining whether an indication identifier is directed to an authentication region in the VR scene, where the indication identifier is generated by the fingerprint collection device in the VR scene; and when it is determined that the indication identifier is directed to the authentication region, displaying prompt information in the VR scene, where the prompt information is used to prompt to enter the to-be-authenticated fingerprint information.

Optionally, the storage medium is further configured to store program code used for performing the following step: after the authentication result information sent by the authenticator is received in the VR scene, and when the authentication result information indicates that the to-be-authenticated fingerprint information has passed the authentication, executing, in the VR scene, a resource transfer event corresponding to the authentication region.

Optionally, the storage medium is further configured to store program code used for performing the following exemplary steps: sending, from the VR scene, a first timestamp to the authenticator, where the first timestamp is a time point at which the fingerprint collection device collects the to-be-authenticated fingerprint information; and sending the to-be-authenticated fingerprint information and a second timestamp to the authenticator by using the fingerprint collection device and a communication terminal device, where the second timestamp is a time point at which the fingerprint collection device collects the to-be-authenticated fingerprint information, the fingerprint collection device performs data transmission with the communication terminal device by using an established connection to the communication terminal device, and the first timestamp and the second timestamp are used by the authenticator to authenticate the to-be-authenticated fingerprint information.

Optionally, the storage medium is further configured to store program code used for performing the following exemplary steps: when the authenticator determines that the first timestamp matches the second timestamp, and fingerprint information matched with the to-be-authenticated fingerprint information exists in a fingerprint database, receiving, in the VR scene, first authentication result information sent by the authenticator, where the first authentication result information is used to indicate that the to-be-authenticated fingerprint information has passed the authentication; and when the authenticator determines that the first timestamp does not match the second timestamp, and/or no fingerprint information matched with the to-be-authenticated fingerprint information exists in the fingerprint database, receiving, in the VR scene, second authentication result information sent by the authenticator, where the second authentication result information is used to indicate that the to-be-authenticated fingerprint information has unpassed the authentication.

Optionally, the storage medium is further configured to store program code used for performing the following exemplary steps: after the authentication result information sent by the authenticator is received in the VR scene, displaying the authentication result information in the VR scene.

Optionally, for specific examples in this embodiment, refer to the examples described in the exemplary Embodiment 1 and Embodiment 2, and details are not repeated herein.

In another embodiment, as described above, after the authentication request is received in the VR scene, and before the to-be-authenticated fingerprint information is collected by using the fingerprint collection device in the physical scene, a step of determining whether the indication identifier is directed to the authentication region in the VR scene is further included. The indication identifier is generated by the fingerprint collection device in the VR scene. In other words, the authentication region further needs to be selected by using the indication identifier during authentication based on the VR scene.

For at least this purpose, the present disclosure further provides a virtual object selection method, to select a virtual object by using an operation focal point in the VR scene. The operation focal point mentioned in the following embodiment is a point corresponding to an input device in a three-dimensional virtual environment, in other words, is equivalent to the indication identifier in the VR scene-based authentication solution. In a virtual object selection solution, a specific implementation form of a virtual object may be the authentication region in the VR scene-based authentication solution. The following describes in detail the virtual object selection solution by using the exemplary Embodiment 5 to Embodiment 7.

For example, a virtual object selection method may include: determining a location of an operation focal point in a three-dimensional virtual environment, the operation focal point being a point corresponding to an input device in the three-dimensional virtual environment, the three-dimensional virtual environment including a virtual object, and the virtual object including a controlled point used for receiving an operation; determining a three-dimensional operation range of the operation focal point by using the operation focal point as a reference location; and determining a virtual object whose controlled point is located in the three-dimensional operation range as a selected virtual object when an operation instruction is received.

Optionally, when the operation instruction is received, determining the virtual object whose controlled point is located in the three-dimensional operation range; and determining the selected virtual object according to attribute information of the virtual objects when there are at least two virtual objects. The attribute information includes at least one of an object type of the virtual object, a priority of the virtual object, and a distance between the controlled point of the virtual object and the operation focal point.

Optionally, the attribute information includes the object type of the virtual object; and determining the selected virtual object according to attribute information of the virtual objects when there are at least two virtual objects includes: obtaining an operation type corresponding to the operation instruction; determining an object type corresponding to each of the virtual objects; determining, from the object type corresponding to each of the virtual objects, a target object type matching the operation type, wherein the target object type is a type capable of responding to the operation instruction; and determining a virtual object having the target object type as the selected virtual object.

Optionally, the attribute information includes the priority of the virtual object; and determining the selected virtual object according to attribute information of the virtual objects when there are at least two virtual objects includes: determining a priority of each of the virtual objects; and determining a virtual object having a highest priority as the selected virtual object.

Optionally, the attribute information includes the distance between the controlled point of the virtual object and the operation focal point; and determining the selected virtual object according to attribute information of the virtual objects when there are at least two virtual objects includes: determining a distance between a controlled point of each of the virtual objects and the operation focal point; and determining a virtual object having a shortest distance as the selected virtual object.

Optionally, the attribute information includes at least two of the object type of the virtual object, the priority of the virtual object, and the distance between the controlled point of the virtual object and the operation focal point; and determining the selected virtual object according to attribute information of the virtual objects when there are at least two virtual objects includes: determining, according to an ith type of attribute information of each of the virtual objects, a virtual object that is selected at an $i^{th}$ time; and when one virtual object is selected at the $i^{th}$ time, determining the virtual object selected at the $i^{th}$ time as the selected virtual object; or when at least two virtual objects are selected at the $i^{th}$ time, determining, according to an (i+1)th type of attribute information of each of the virtual objects, a virtual object that is selected at an (i+1)th time. An initial value of i is 1 and i is an integer.

A virtual reality (VR) system is also provided. The VR system includes a head-mounted display (HMD), a processing unit (or a processor), and an input device. The HMD is connected to the processing unit and the processing unit is connected to the input device. The processing unit is configured to implement, for example, the virtual object selection methods.

Exemplary Embodiment 5

FIG. 16 is a schematic structural diagram of a VR system according to various embodiments of the present disclosure. The VR system includes a head-mounted display (HMD) 120, a processing unit 140 (or a processor), and an input device 160.

The HMD 120 is a display worn on the head of a user for image display. The HMD 120 includes a wearing part and a display part. The wearing part includes temples and an elastic band that are used to wear the HMD 120 on the head of the user, and the display part includes a left-eye display screen and a right-eye display screen. The HMD 120 can display different images on the left-eye display screen and the right-eye display screen, to simulate a three-dimensional virtual environment for the user.

The HMD 120 is electrically connected to the processing unit 140 by using a flexible circuit board or a hardware interface.

The processing unit 140 usually is integrated inside the HMD 120. The processing unit 140 is configured to model the three-dimensional virtual environment, generate a display picture corresponding to the three-dimensional virtual environment, and generate a virtual object and the like in the three-dimensional virtual environment. The processing unit 140 receives an input signal of the input device 160, and generates the display picture of the HMD 120. The processing unit 140 usually is implemented by using electronic components, for example, a processor, a memory, and an image processing unit, disposed on a circuit board. Optionally, the processing unit 140 further includes a motion sensor, configured to capture an action of the head of the user, and change the display image of the HMD 120 according to the action of the head of the user.

The processing unit 140 is connected to the input device 160 by using a cable, a Bluetooth connection, or a WiFi connection.

The input device 160 is an input peripheral, for example, a motion sensing glove, a motion sensing joystick, a remote control, a treadmill, a mouse, a keyboard, or an eye focus device. Optionally, the input device 160 is provided with a physical key and a motion sensor. The physical key is configured to receive an operation instruction triggered by the user, and the motion sensor is configured to collect a spatial gesture of the input device 160. As one type of motion sensor, a gravity acceleration sensor may detect magnitude of accelerations in various directions (e.g., on three axes), may detect magnitude and a direction of the gravity when static. A gyroscope sensor may detect sizes of angular velocities in various directions, and detect a rotation action of the input device 160. When the operation instruction is received, the input device 160 sends the operation instruction to the processing unit 140. When the input device 160 moves and/or rotates, the input device 160 sends motion data and/or rotation data to the processing unit 140.

FIG. 17 is a method flowchart of a virtual object selection method system according to some embodiments of the present disclosure. As an example, the virtual object selection method is applied to the VR system shown in FIG. 16. The method includes the following exemplary steps.

S1701. Determining a location of an operation focal point in a three-dimensional virtual environment, where the operation focal point is a point corresponding to an input device in the three-dimensional virtual environment, the three-dimensional virtual environment includes a virtual object, and the virtual object includes a controlled point used for receiving an operation.

The three-dimensional virtual environment is a virtual environment obtained by a processing unit through modeling. The three-dimensional virtual environment may be a room, a building, a game scene, or the like. Optionally, the three-dimensional virtual environment includes a virtual coordinate system formed by an x axis, a y axis, and a z axis. Any two axes of the x axis, y axis, and z axis are perpendicular to each other.

Figure 18A:
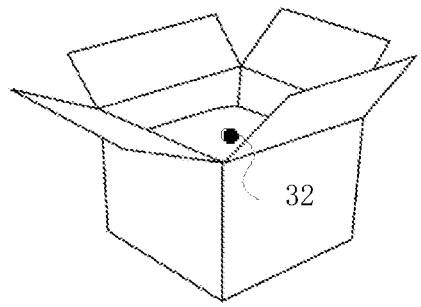
FIG. 18A to FIG. 18C are schematic diagrams of a controlled point according to an exemplary embodiment of the present disclosure.
Figure 18B:
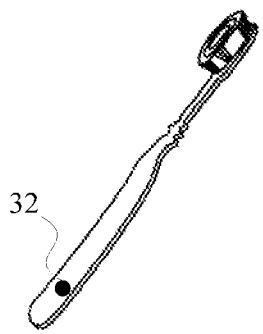
Figure 18C:
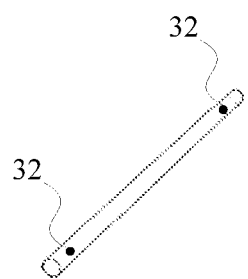

The three-dimensional virtual environment includes a plurality of virtual objects, and each virtual object has corresponding three-dimensional coordinates in the three-dimensional virtual environment. Each virtual object has at least one controlled point. For example, the virtual object is a box, and a center of the box is a controlled point 32, as shown in FIG. 18A. For another example, the virtual object is a toothbrush, and a point in a toothbrush joystick of the toothbrush is a controlled point 32, as shown in FIG. 18B. For another example, the virtual object is a stick, and one controlled point 32 is disposed in each of two ends of the stick, as shown in FIG. 18C.

The operation focal point is a point corresponding to the input device in the three-dimensional virtual environment, and the operation focal point is used to indicate an operation location of the input device in the three-dimensional virtual environment. Optionally, the operation focal point has corresponding three-dimensional coordinates in the three-dimensional virtual environment. When the input device moves, the operation focal point also moves.

S1702. Determining a three-dimensional operation range of the operation focal point by using the operation focal point as a reference location.

Optionally, the three-dimensional operation range is a spherical range using the operation focal point as a center of sphere. For example, the three-dimensional operation range is a spherical range using the operation focal point as the center of sphere and having a 20-centimeter radius.

As the operation focal point moves in the three-dimensional virtual environment, the three-dimensional operation range also moves in the three-dimensional virtual environment.

A control unit determines the three-dimensional operation range of the operation focal point by using the operation focal point as the reference location.

S1703. Determining a virtual object whose controlled point is located in the three-dimensional operation range as a selected virtual object when an operation instruction is received.

The controlled point is a point used for receiving an operation on the virtual object. Optionally, the controlled point has corresponding three-dimensional coordinates in the three-dimensional virtual environment. When the virtual object moves, the controlled point also moves.

The operation instruction is an instruction received by the input device. The operation instruction includes any one of an object selection instruction, an object pickup instruction, an object open instruction, an object use instruction, an object slapping instruction, and an attack instruction. In various embodiments, any suitable operation type of the operation instruction may be encompassed based on a specific embodiments and applications.

Optionally, when the processing unit receives the operation instruction, the processing unit detects whether a controlled point of a virtual object exists in the three-dimensional operation range, and when a controlled point of a virtual object exists in the three-dimensional operation range, the processing unit determines the virtual object whose controlled point is located in the three-dimensional operation range as the selected virtual object.

Figure 18D:
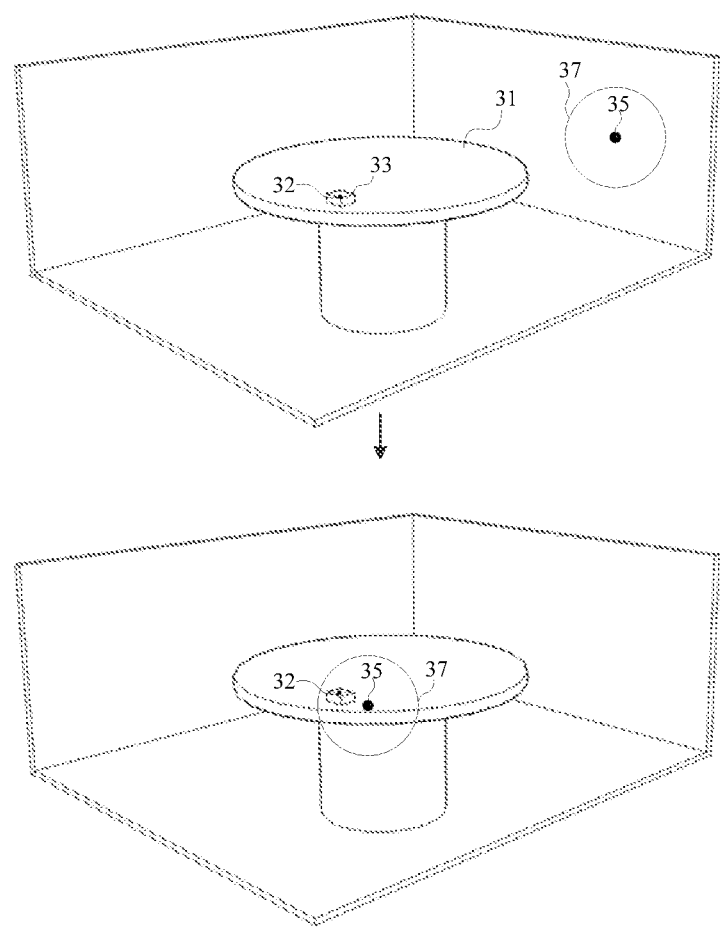
FIG. 18D is a schematic diagram of a specific implementation of the virtual object selection method provided in FIG. 17.

Exemplarily, referring to FIG. 18D, a three-dimensional virtual environment 30 includes a virtual desk 31 and a virtual box 33, the virtual box 33 is placed on the virtual desk 31, and the control unit determines a spherical three-dimensional operation range 37 using an operation focal point 35 as a center of sphere. When the operation focal point 35 moves, the three-dimensional operation range 37 also moves. When the control unit receives the object open instruction, the control unit detects whether a controlled point 32 of a virtual object exists in the three-dimensional operation range 37, and when the controlled point 32 of the virtual box 33 is located in the three-dimensional operation range 37, the control unit determines the virtual box 33 as the selected virtual object.

Optionally, when no controlled point of a virtual object exists in the three-dimensional operation range, the processing unit does not respond to the operation instruction. When a controlled point of one virtual object exists in the three-dimensional operation range, the processing unit directly uses the virtual object as the selected virtual object. When controlled points of at least two virtual objects exist in the three-dimensional operation range, the processing unit automatically selects, from the controlled points of the at least two virtual objects, one virtual object as the selected virtual object.

In the disclosed virtual object selection method, when the three-dimensional operation range of the operation focal point is determined using the operation focal point as the reference location, a three-dimensional operation range needs to be determined for only one operation focal point, and a response range does not need to be set for a controlled point of each virtual object, thereby resolving a problem that if a response range is set for a controlled point of each virtual object, a large amount of computing resources of the processing unit need to be consumed when there are many virtual objects in the three-dimensional virtual environment. Therefore, a three-dimensional operation range needs to be determined for only one operation focal point regardless of a quantity of virtual objects, thereby achieving an effect of saving a large quantity of computing resources of the processing unit.

Figure 19:
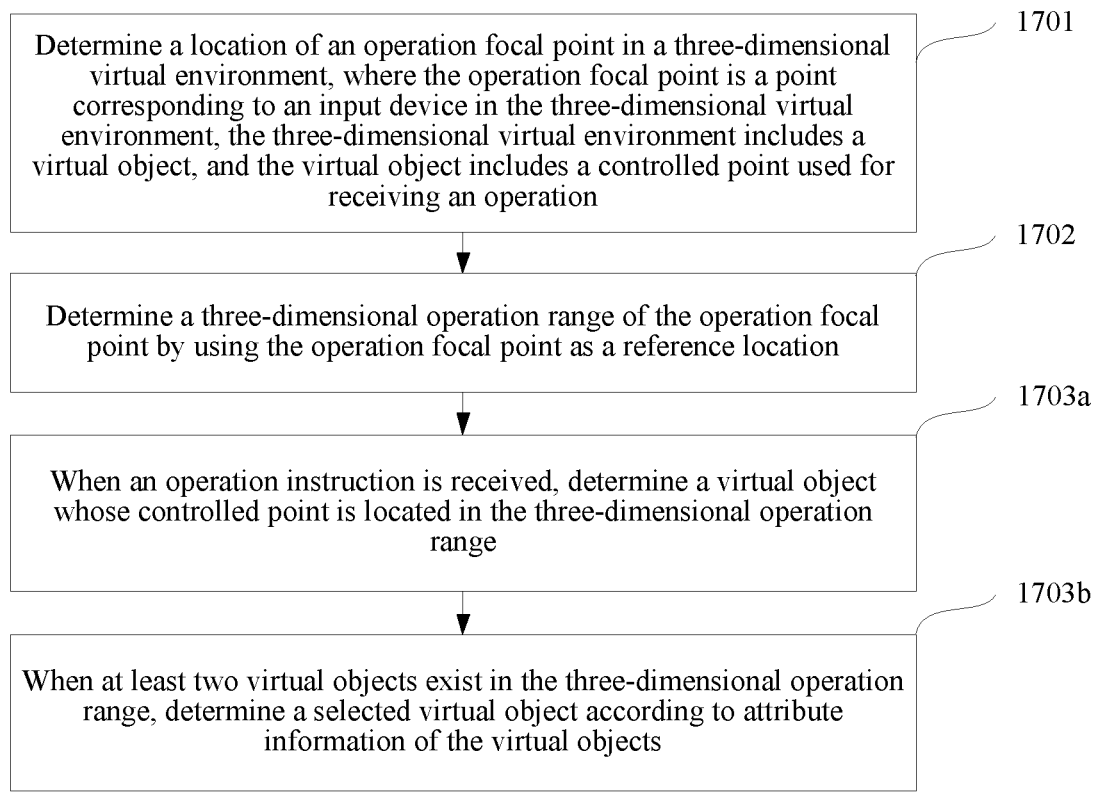
FIG. 19 is a flowchart of a virtual object selection method according to another exemplary embodiment of the present disclosure.

In FIG. 18D, an example in which a controlled point of one virtual object exists in the three-dimensional operation range is used. However, in more implementation scenarios, controlled points of at least two virtual objects may be located in the three-dimensional operation range. In this case, S1703 may be replaced with S1703a and S1703b for implementation, as shown in FIG. 19.

S1703a. When the operation instruction is received, determining a virtual object whose controlled point is located in the three-dimensional operation range.

When the operation instruction is received, the processing unit detects whether a controlled point of a virtual object exists in the three-dimensional operation range. The detection process may be implemented by performing an intersection obtaining operation or a collision detection operation between the three-dimensional operation range and the controlled point.

S1703b. When at least two virtual objects exist in the three-dimensional operation range, determining the selected virtual object according to attribute information of the virtual objects.

The processing unit automatically determines, from the at least two virtual objects according to the attribute information of the virtual objects, one virtual object as the selected virtual object.

The attribute information of the virtual object includes at least one of an object type of the virtual object, a priority of the virtual object, and a distance between the controlled point of the virtual object and the operation focal point.

In the disclosed virtual object selection method, when there are at least two virtual objects, the processing unit automatically selects one selected virtual object, so that operation steps and time costs of the user are reduced, and the will of the independent choice of the user and the convenience of automatically selecting a virtual object both can be satisfied.

The attribute information of the virtual object includes at least one of the three types of information. When the attribute information of the virtual object includes the object type of the virtual object, refer to the embodiment shown in FIG. 20A. When the attribute information of the virtual object includes the priority of the virtual object, refer to the embodiment shown in FIG. 21A. When the attribute information of the virtual object includes the distance between the controlled point of the virtual object and the operation focal point, refer to the embodiment shown in FIG. 22A.

Figure 20A:
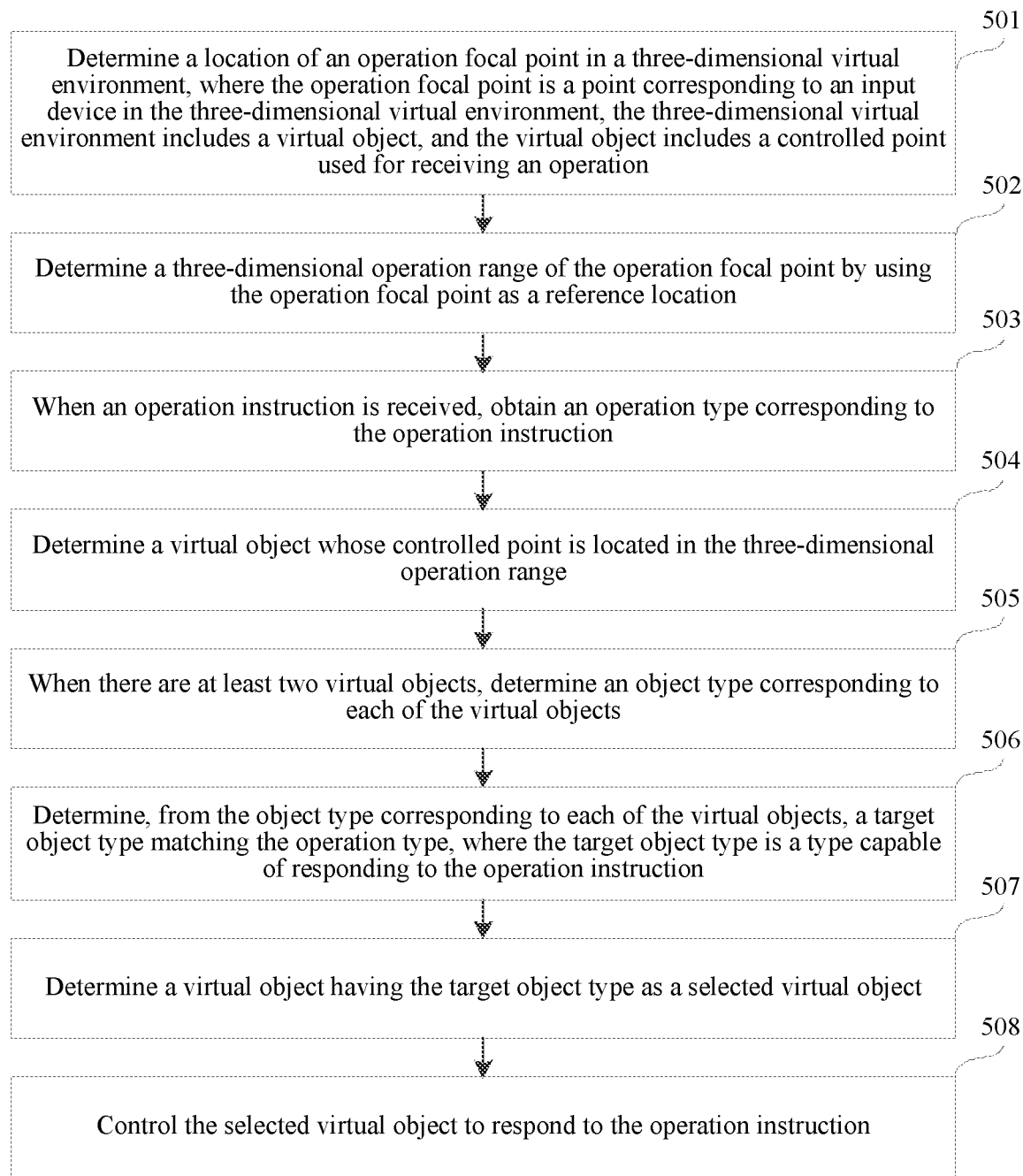
FIG. 20A is a flowchart of a virtual object selection method according to another exemplary embodiment of the present disclosure.

Referring to FIG. 20A, FIG. 20A is a method flowchart of a virtual object selection method system according to an embodiment of the present disclosure. As an example, the virtual object selection method is applied to the VR system shown in FIG. 16. The method includes the following exemplary steps.

S501. Determining a location of an operation focal point in a three-dimensional virtual environment, where the operation focal point is a point corresponding to an input device in the three-dimensional virtual environment, the three-dimensional virtual environment includes a virtual object, and the virtual object includes a controlled point used for receiving an operation.

After the VR system runs, a processing unit models the three-dimensional virtual environment, and an input device has a corresponding operation focal point in the three-dimensional virtual environment. The processing unit determines the location of the operation focal point in the three-dimensional virtual environment according to a spatial location of the input device in a real environment.

When the input device modes, the input device sends motion data to the processing unit, and the processing unit moves the operation focal point in the three-dimensional virtual environment according to the motion data. Optionally, if the operation focal point is an operation focal point having directivity, for example, a hand-shaped operation focal point or a gun-shaped operation focal point. When the input device rotates, the input device sends rotation data to the processing unit, and the processing unit rotates the operation focal point in the three-dimensional virtual environment according to the rotation data.

The motion data is used to indicate moving distances of the input device in the x axis, the y axis, and/or the z axis.

The rotation data is used to indicate rotation angles of the input device in the x axis, the y axis, and/or the z axis.

S502. Determining a three-dimensional operation range of the operation focal point by using the operation focal point as a reference location.

Exemplarily, the processing unit determines a spherical three-dimensional operation range using the operation focal point as a center of sphere, and uses the spherical three-dimensional operation range as the three-dimensional operation range of the operation focal point.

Optionally, when the operation focal point moves, the three-dimensional operation range of the operation focal point also moves.

S503. When an operation instruction is received, obtaining an operation type corresponding to the operation instruction.

A user triggers the operation instruction on the input device. A triggering manner includes but is not limited to: pressing a physical key on the input device, making a predetermined gesture by using the input device, and shaking the input device.

The operation type of the operation instruction includes but is not limited to at least one of selecting an object, picking up an object, opening an object, using an object, slapping an object, and stacking.

For example, when a physical key A on the input device is pressed, an object pickup instruction is triggered, and when a physical key B on the input device is pressed, an object open instruction is triggered.

The input device sends the operation instruction to the processing unit, and after receiving the operation instruction, the processing unit determines the operation type of the operation instruction. Exemplarily, the operation type of the operation instruction is opening an object.

S504. Determining a virtual object whose controlled point is located in the three-dimensional operation range.

Optionally, the processing unit performs an intersection obtaining operation on the three-dimensional operation range and a controlled point of a virtual object, and when an intersection exists, the processing unit determines that the controlled point of the virtual object is located in the three-dimensional operation range.

Optionally, when no controlled point of a virtual object exists in the three-dimensional operation range, the processing unit does not respond to the operation instruction, and when a controlled point of one virtual object exists in the three-dimensional operation range, the processing unit determines the virtual object as the selected virtual object.

When at least two virtual objects are in the three-dimensional operation range, S505 is performed.

S505. When there are at least two virtual objects, determining an object type corresponding to each of the virtual objects.

The virtual objects correspond to respective object types. The object type includes but is not limited to a wall, a column, a desk, a chair, a cup, a kettle, a disk, a plant, people, and a rock. Any suitable object type division manner may be included in the present disclosure.

S506. Determining, from the object type corresponding to each of the virtual objects, a target object type matching the operation type, where the target object type is a type capable of responding to the operation instruction.

For each operation instruction, not all virtual objects can respond to the operation instruction. For example, a box can respond to an object open instruction, but a spoon cannot respond to the object open instruction. For another example, a cup can respond to an object pickup instruction, but a wall cannot respond to the object pickup instruction. The object pickup instruction is an instruction used for picking up an object to a virtual hand.

Optionally, the processing unit stores a matching correspondence between an operation type and an object type. Table 1 exemplarily shows the correspondence.

TABLE 1

| Operation type | Matched object type |
|---|---|
| Object open instruction | Box, kettle, case, cabinet, and manhole cover |
| Object pickup instruction | Cup, disk, spoon, weapon, pen, and book |
| Attack instruction | Animal, and people |

The processing unit determines, according to the pre-stored matching correspondence, the target object type matching the operation type. The target object type is a type capable of responding to the operation instruction.

S507. Determining a virtual object having the target object type as a selected virtual object.

Figure 20B:
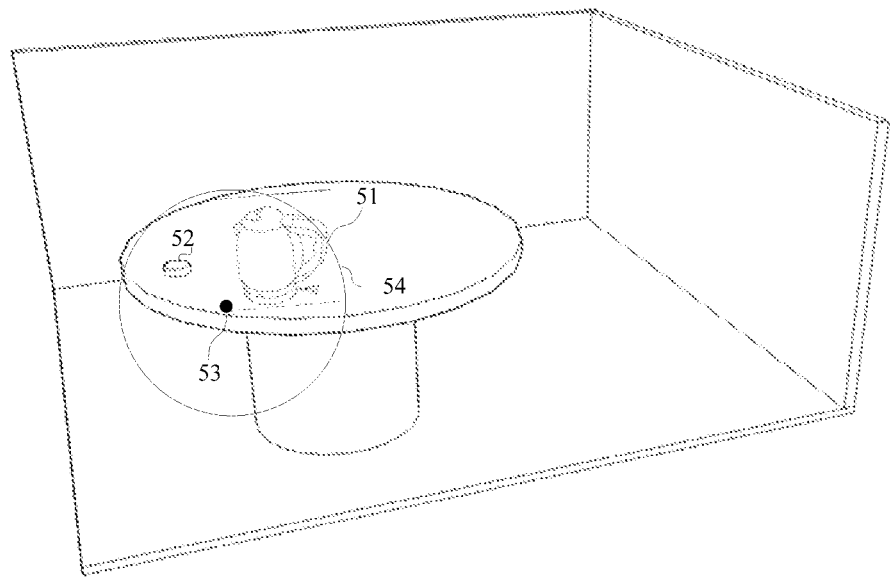
FIG. 20B is a schematic diagram of a specific implementation of the virtual object selection method provided in FIG. 20A.

Exemplarily, referring to FIG. 20B, a three-dimensional virtual environment 50 includes a virtual kettle 51 and a virtual cup 52. A control unit determines a spherical three-dimensional operation range 54 using an operation focal point 53 as a center. When the control unit receives the object open instruction, it is determined that a controlled point of the virtual kettle 51 and a controlled point of the virtual cup 52 are located in the three-dimensional operation range 54, the control unit determines that an object type of the virtual kettle 51 matches the operation type and an object type of the virtual cup 52 does not match the operation type, and the control unit determines the virtual kettle 51 as the selected virtual object.

S508. Controlling the selected virtual object to respond to the operation instruction.

The processing unit controls the virtual kettle 51 to respond to the object open instruction, for example, controls the virtual kettle 51 to present an animation of opening a kettle cover.

In the disclosed virtual object selection method, when at least two virtual objects are in the three-dimensional operation range, one virtual object is selected automatically as the selected virtual object by using the object type matching the operation type, so that not only the will of independent choice of the user can be satisfied, but also the virtual object can be selected automatically, thereby reducing a quantity of times of selections by the user when there are multiple virtual objects, and efficiently and intelligently helping the user in selecting an appropriate virtual object.

Figure 21A:
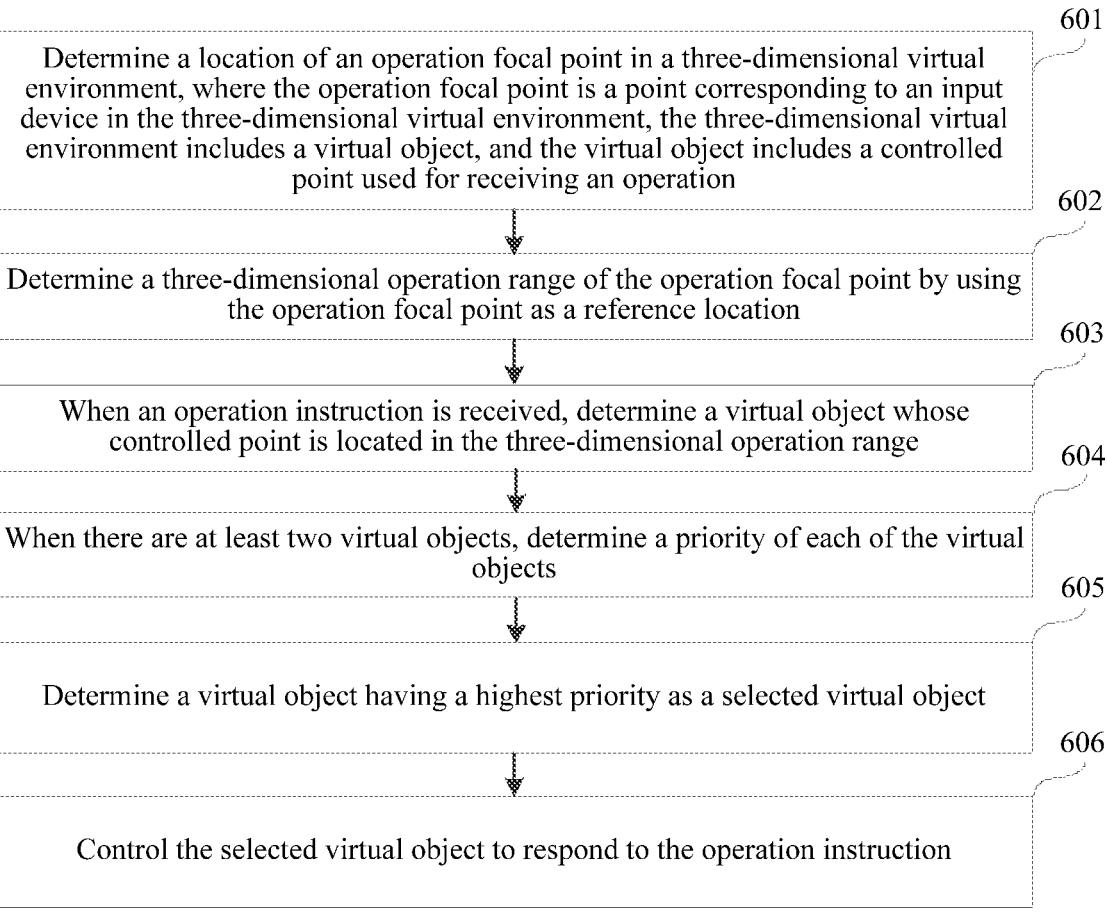
FIG. 21A is a flowchart of a virtual object selection method according to another exemplary embodiment of the present disclosure.

Referring to FIG. 21A, FIG. 21A is a method flowchart of a virtual object selection method system according to an embodiment of the present disclosure. As an example, the virtual object selection method is applied to the VR system shown in FIG. 16. The method includes the following exemplary steps.

S601. Determining a location of an operation focal point in a three-dimensional virtual environment, where the operation focal point is a point corresponding to an input device in the three-dimensional virtual environment, the three-dimensional virtual environment includes a virtual object, and the virtual object includes a controlled point used for receiving an operation.

S602. Determining a three-dimensional operation range of the operation focal point by using the operation focal point as a reference location.

Exemplarily, a processing unit determines an ellipsoid three-dimensional operation range using the operation focal point as a center of sphere, and uses the spherical three-dimensional operation range as the three-dimensional operation range of the operation focal point.

Optionally, when the operation focal point moves, the three-dimensional operation range of the operation focal point also moves.

S603. When an operation instruction is received, determining a virtual object whose controlled point is located in the three-dimensional operation range.

Exemplarily, the operation instruction is an object opening instruction.

Optionally, the processing unit performs an intersection obtaining operation on the three-dimensional operation range and a controlled point of a virtual object, and when an intersection exists, the processing unit determines that the controlled point of the virtual object is located in the three-dimensional operation range.

Optionally, when no controlled point of a virtual object exists in the three-dimensional operation range, the processing unit does not respond to the operation instruction, and when a controlled point of one virtual object exists in the three-dimensional operation range, the processing unit determines the virtual object as the selected virtual object.

When at least two virtual objects are in the three-dimensional operation range, S604 is performed.

S604. When there are at least two virtual objects, determining a priority of each of the virtual objects.

Optionally, the priority of each virtual object is a preset priority. Alternatively, the priority of each virtual object is in positive correlation with a quantity of times of historical use, and a larger quantity of times of historical use indicates a higher priority.

Figure 21B:
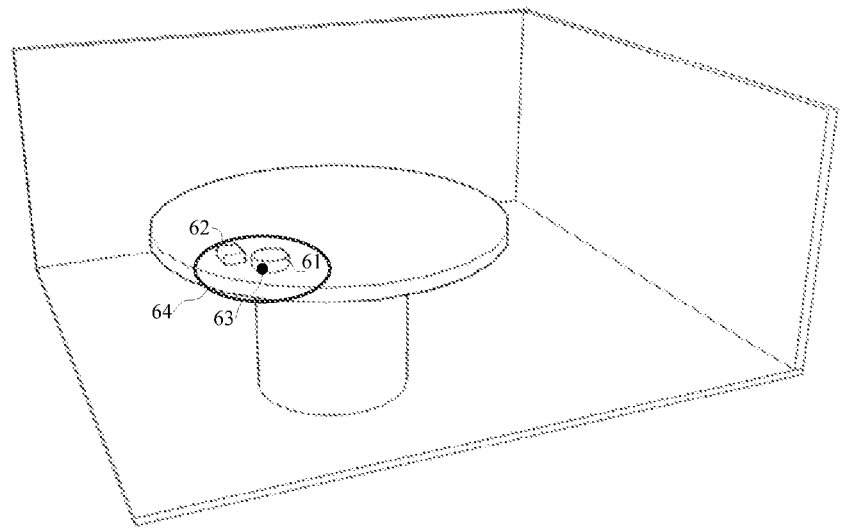
FIG. 21B is a schematic diagram of a specific implementation of the virtual object selection method provided in FIG. 21A.

Exemplarily, referring to FIG. 21B, a three-dimensional virtual environment 60 includes a virtual round box 61 and a virtual cubic box 62. A control unit determines an ellipsoid three-dimensional operation range 64 using an operation focal point 63 as a center. When the control unit receives an object open instruction, it is determined that the virtual object 61 and the virtual object 62 are located in the three-dimensional operation range 64, the control unit determines that the virtual round box 61 has a preset priority 2, and the virtual cubic box 62 has a preset priority 1.

S605. Determining a virtual object having a highest priority as a selected virtual object.

Because the priority 1 is greater than the priority 2, the control unit determines the virtual cubic box 62 as the selected virtual object.

S606. Controlling the selected virtual object to respond to the operation instruction.

The processing unit opens the virtual cubic box 62.

In the disclosed virtual object selection method, when at least two virtual objects are in the three-dimensional operation range, one virtual object is selected automatically as the selected virtual object by using priorities, so that not only the will of independent choice of the user can be satisfied, but also the virtual object can be selected automatically, thereby reducing a quantity of times of selections by the user when there are multiple virtual objects, and efficiently and intelligently helping the user in selecting an appropriate virtual object.

Figure 22A:
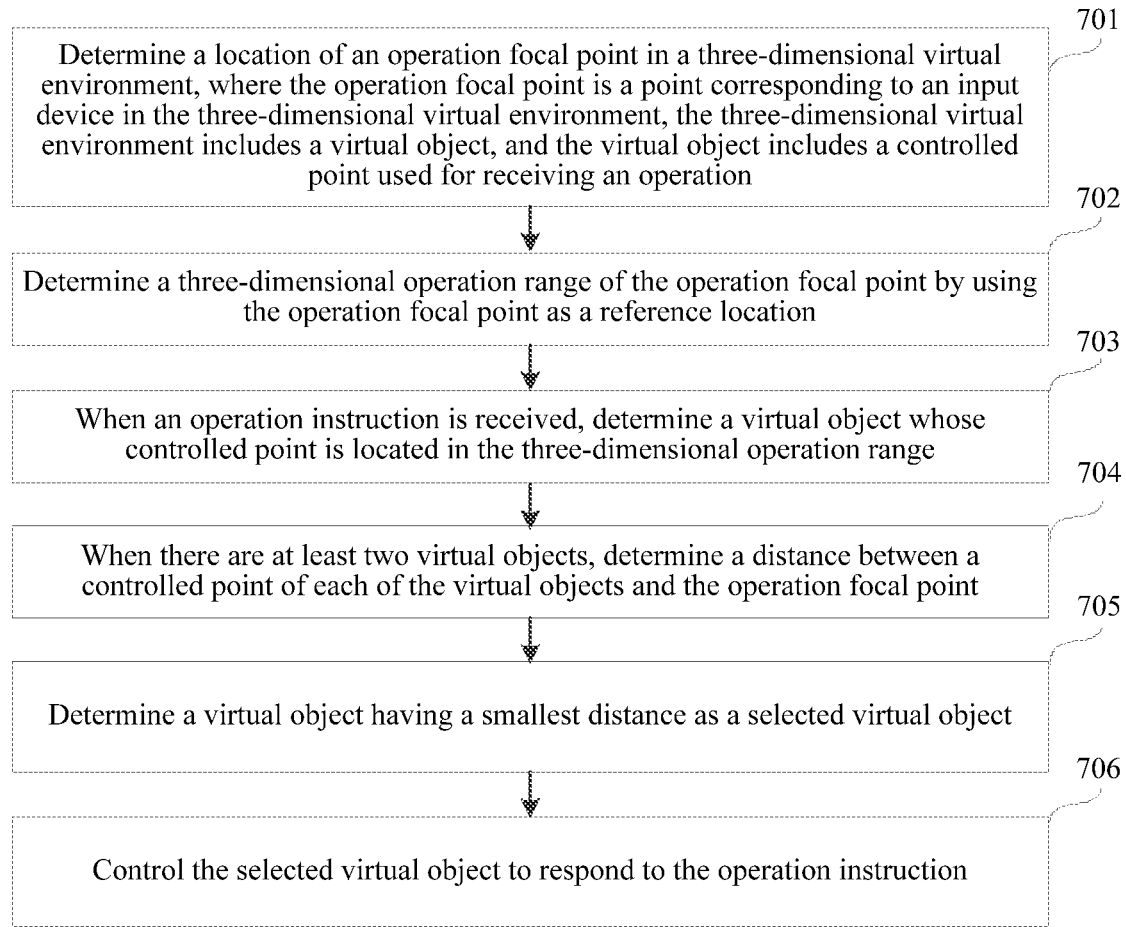
FIG. 22A is a flowchart of a virtual object selection method according to another exemplary embodiment of the present disclosure.

FIG. 22A is a method flowchart of a virtual object selection method system according to an exemplary embodiment of the present disclosure. As an example, the virtual object selection method is applied to the VR system shown in FIG. 16. The method includes the following exemplary steps.

S701. Determining a location of an operation focal point in a three-dimensional virtual environment, where the operation focal point is a point corresponding to an input device in the three-dimensional virtual environment, the three-dimensional virtual environment includes a virtual object, and the virtual object includes a controlled point used for receiving an operation.

S702. Determining a three-dimensional operation range of the operation focal point by using the operation focal point as a reference location.

Exemplarily, the operation focal point is a hand-shaped operation focal point having directivity. A processing unit determines the conical three-dimensional operation range using the hand-shaped operation focal point as a start point and a direction with a palm facing outward as a center line.

Optionally, when the operation focal point moves, the three-dimensional operation range of the operation focal point also moves, and when the operation focal point rotates, the three-dimensional operation range of the operation focal point also rotates.

S703. When an operation instruction is received, determining a virtual object whose controlled point is located in the three-dimensional operation range.

Exemplarily, the operation instruction is an object pickup instruction.

Optionally, the processing unit performs an intersection obtaining operation on the three-dimensional operation range and a controlled point of a virtual object, and when an intersection exists, the processing unit determines that the controlled point of the virtual object is located in the three-dimensional operation range.

Optionally, when no controlled point of a virtual object exists in the three-dimensional operation range, the processing unit does not respond to the operation instruction, and when a controlled point of one virtual object exists in the three-dimensional operation range, the processing unit determines the virtual object as the selected virtual object.

When at least two virtual objects are in the three-dimensional operation range, S704 is performed.

S704. When there are at least two virtual objects, determining a distance between a controlled point of each of the virtual objects and the operation focal point.

When at least two virtual objects are in the three-dimensional operation range, the processing unit calculates the distance between the controlled point of each virtual object and the operation focal point.

Assuming that coordinates of the operation focal point A in the three-dimensional virtual environment are (x1, y1, z1), and coordinates of a controlled point B of a virtual object in the three-dimensional virtual environment are (x2, y2, z2), a distance d between the operation focal point A and the controlled point B is:

$$d=\sqrt{(x1-x2)^2+(y1-y2)^2+(z1-z2)^2}.$$

Optionally, if one virtual object includes multiple controlled points, the processing unit calculates a distance between each controlled point of the virtual object and the operation focal point, and uses a smallest distance as a distance between a controlled point of the virtual object and the operation focal point.

S705. Determining a virtual object having a smallest distance as a selected virtual object.

After calculating the distance between the controlled point of each virtual object and the operation focal point, the processing unit determines the virtual object having the smallest distance as the selected virtual object.

Figure 22B:
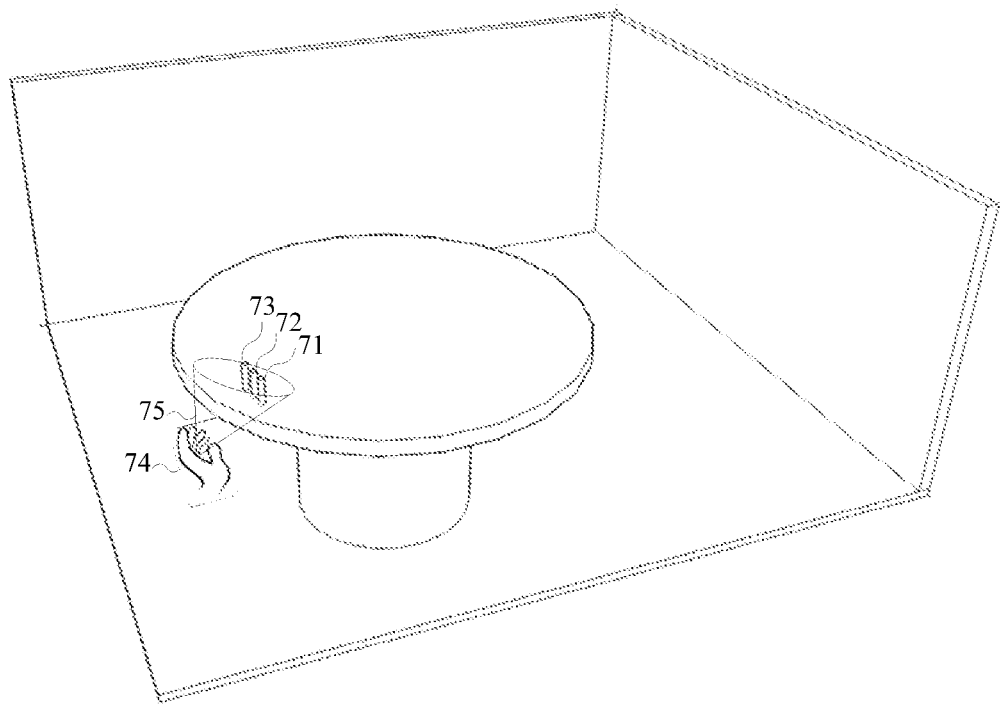
FIG. 22B is a schematic diagram of a specific implementation of the virtual object selection method provided in FIG. 22A.

Exemplarily, referring to FIG. 22B, a three-dimensional virtual environment 70 includes a virtual object 71, a virtual object 72, and a virtual object 73. A control unit determines a conical three-dimensional operation range 75 using a hand-shaped operation focal point 74 as a start point and a direction with a palm facing outward as a center line. When the control unit receives the object pickup instruction, it is determined that the virtual object 71, the virtual object 72, and the virtual object 73 are in the three-dimensional operation range 75, the control unit calculates a distance 1 between a controlled point of the virtual object 71 and the hand-shaped operation focal point 74, a distance 2 between a controlled point of the virtual object 72 and the hand-shaped operation focal point 74, and a distance 3 between a controlled point of the virtual object 73 and the hand-shaped operation focal point 74. Because the distance 1<the distance 2<the distance 3, the control unit determines the virtual object 71 as the selected virtual object.

S706. Controlling the selected virtual object to respond to the operation instruction.

Exemplarily, the operation instruction is an object pickup instruction, and the processing unit picks up the virtual object 1 to a virtual hand corresponding to the hand-shaped operation focal point 74.

In the disclosed virtual object selection method, when at least two virtual objects are in the three-dimensional operation range, one virtual object is selected automatically as the selected virtual object by using distances, so that not only the will of independent choice of the user can be satisfied, but also the virtual object can be selected automatically, thereby reducing a quantity of times of selections by the user when there are multiple virtual objects, and efficiently and intelligently helping the user in selecting an appropriate virtual object.

Two or three of the embodiment in FIG. 20A, the embodiment in FIG. 21A, and the embodiment in FIG. 22A can be combined for implementation. Exemplarily, when multiple virtual objects are in the three-dimensional operation range, a virtual object having a matched object type and a highest priority is determined as the selected virtual object; or a virtual object having a matched object type and a shortest distance is determined as the selected virtual object; or a virtual object having a highest priority and a shortest distance is determined as the selected virtual object, or a virtual object having a matched object type, highest priority, and shortest distance is determined as the selected virtual object.

Figure 23A:
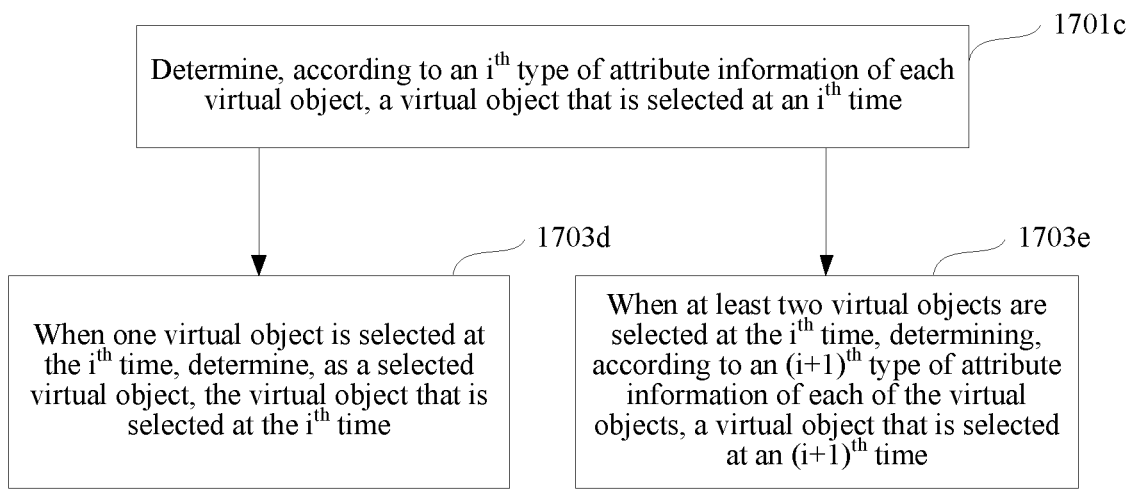
FIG. 23A is a flowchart of a virtual object selection method according to another exemplary embodiment of the present disclosure.

The following gives, by using FIG. 23A, an example of an embodiment in which the embodiment of FIG. 20A, the embodiment of FIG. 21A, and the embodiment of FIG. 22A are combined. When attribute information of a virtual object includes at least two of an object type of the virtual object, a priority of the virtual object, and a distance between a controlled point of the virtual object and an operation focal point, S1703 may be replaced with 51703c and S1703e for implementation, as shown in FIG. 23A.

S1703c. Determining, according to an $i^{th}$ type of attribute information of each virtual object, a virtual object that is selected at an $i^{th}$ time.

Each type of attribute information is one of the foregoing three types of attribute information. An initial value of i is 1 and i is an integer. Exemplarily, a first type of attribute information is the object type of the virtual object, a second type of attribute information is the priority of the virtual object, a third type of attribute information is the distance between the controlled point of the virtual object and the operation focal point. However, any suitable form of each type of attribute information may be included in the present disclosure.

When an $i^{th}$ type of attribute information is the object type of the virtual object, for a process of determining a virtual object that is selected at the $i^{th}$ time, refer to the technical solution provided in the embodiment of FIG. 20A. When the $i^{th}$ type of attribute information is the priority of the virtual object, refer to the technical solution provided in the embodiment of FIG. 21A. When the $i^{th}$ type of attribute information is the distance between the controlled point of the virtual object and the operation focal point, refer to the technical solution provided in the embodiment of FIG. 22A.

When selection is performed for the $i^{th}$ time according to the $i^{th}$ type of attribute information, one virtual object may be selected, and in this case, S1703d is performed; or multiple virtual objects may be selected, and the multiple virtual objects have same $i^{th}$ type of attribute information, and in this case, S1703e is performed.

S1703d. When one virtual object is selected at the $i^{th}$ time, determining, as a selected virtual object, the virtual object that is selected at the $i^{th}$ time.

S1703e. When at least two virtual objects are selected at the $i^{th}$ time, determining, according to an $(i+1)^{th}$ type of attribute information of each of the virtual objects, a virtual object that is selected at an $(i+1)^{th}$ time.

If at least two virtual objects are selected at the $i^{th}$ time, determine, according to the $(i+1)^{th}$ type of attribute information from the virtual objects selected at the $i^{th}$ time, a virtual object that is selected at an $(i+1)^{th}$ time. The foregoing steps are repeated until a final selected virtual object is selected.

For example, if controlled points of multiple virtual objects are in the three-dimensional operation range, the processing unit first determines, according to the first type of attribute information "the object type of the virtual object", a virtual object that is selected at the first time; if one virtual object is selected at the first time, the virtual object is determined as the final selected virtual object; if at least two virtual objects are selected at the first time, the processing unit determines, according to the second type of attribute information "the priority of the virtual object", a virtual object that is selected at the second time; if one virtual object is selected at the second time, the virtual object is determined as the final selected virtual object; if at least two virtual objects are selected at the second time, the processing unit determines, according to the third type of attribute information "the distance between the controlled point of the virtual object and the operation focal point", a virtual object that is selected at the third time; if one virtual object is selected at the third time, the virtual object is determined as the final selected virtual object; if at least two virtual objects are selected at the third time, the processing unit considers that selection fails, and does not make a response or enables an error prompt information to pop up.

Figure 23B:
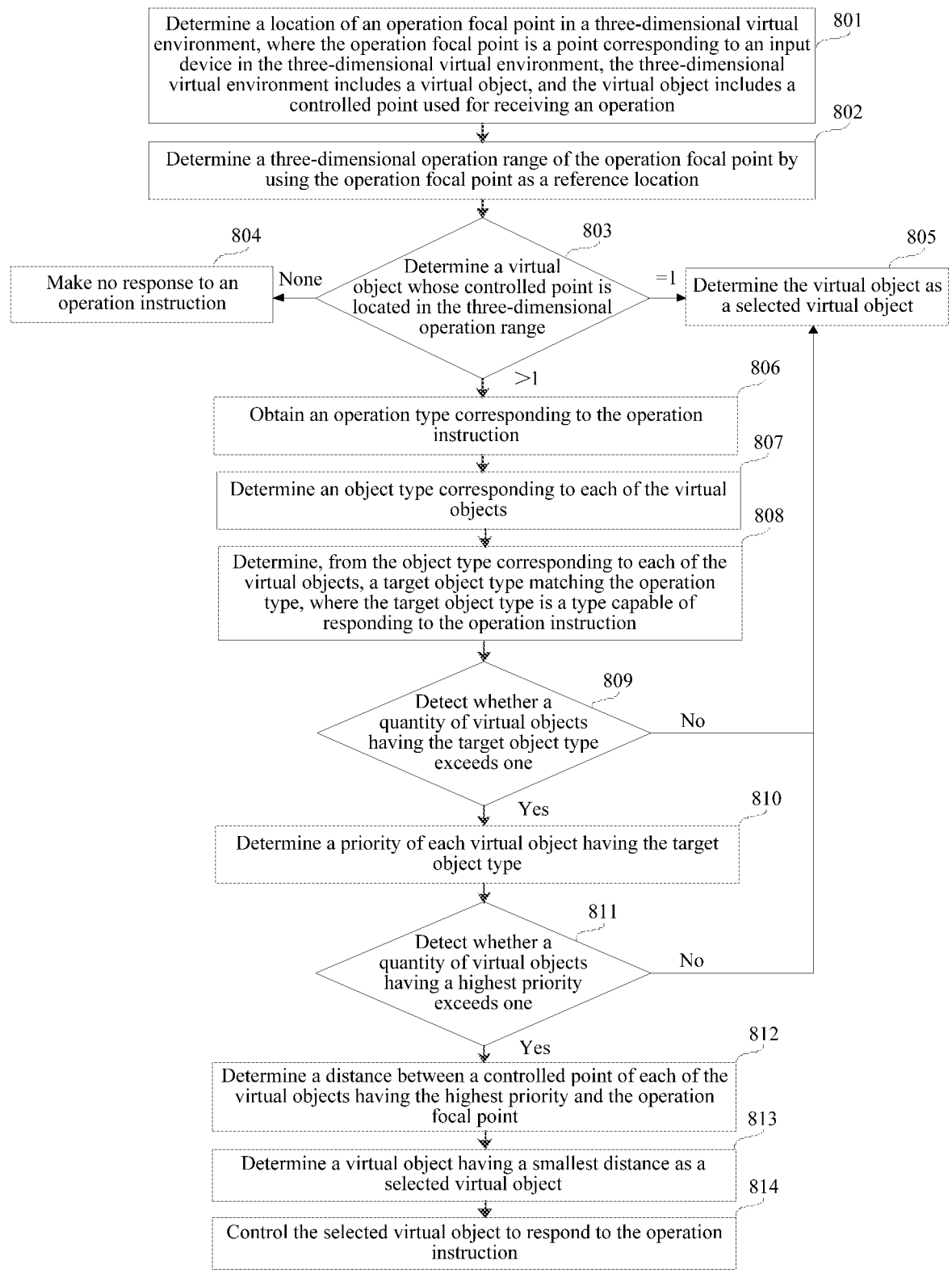
FIG. 23B is a flowchart of a virtual object selection method according to another exemplary embodiment of the present disclosure.

To describe in detail the process in the embodiment of FIG. 23A, the following describes, by using FIG. 23B, the embodiment in which the foregoing three embodiments are combined for implementation.

FIG. 23B is a flowchart of a virtual object selection method according to another exemplary embodiment of the present disclosure. As an example, the virtual object selection method is applied to the VR system shown in FIG. 16. The method includes the following exemplary steps:

S801. Determining a location of an operation focal point in a three-dimensional virtual environment, where the operation focal point is a point corresponding to an input device in the three-dimensional virtual environment, the three-dimensional virtual environment includes a virtual object, and the virtual object includes a controlled point used for receiving an operation.

S802. Determining a three-dimensional operation range of the operation focal point by using the operation focal point as a reference location.

Optionally, the three-dimensional operation range is at least one of a spherical range, an ellipsoid range, a conical range, a cubic range, and a cylindrical range that use the operation focal point as the reference location. Optionally, if the operation focal point is an operation focal point having directivity, for example, a hand-shaped operation focal point or a gun-shaped operation focal point, a processing unit determines the three-dimensional operation range of the operation focal point by using the operation focal point as a start point and a line of direction of the operation focal point as a center line.

S803. When an operation instruction is received, determining a virtual object whose controlled point is located in the three-dimensional operation range.

Optionally, the processing unit performs an intersection obtaining operation on the three-dimensional operation range and a controlled point of a virtual object, and when an intersection exists, the processing unit determines that the controlled point of the virtual object is located in the three-dimensional operation range.

When no controlled point of a virtual object exists in the three-dimensional operation range, S804 is performed.

When a controlled point of one virtual object exists in the three-dimensional operation range, S805 is performed.

When controlled points of at least two virtual objects exist in the three-dimensional operation range, S806 is performed.

S804. Making no response to the operation instruction.

S805. Determining the virtual object as a selected virtual object.

S806. Obtaining an operation type corresponding to the operation instruction.

S807. Determining an object type corresponding to each of the virtual objects.

S808. Determining, from the object type corresponding to each of the virtual objects, a target object type matching the operation type, where the target object type is a type capable of responding to the operation instruction.

S809. Detecting whether a quantity of virtual objects having the target object type exceeds one.

If there is only one virtual object having the target object type, S805 is performed. If there are at least two virtual objects having the target object type, S810 is performed.

S810. Determining a priority of each virtual object having the target object type.

S811. Detecting whether a quantity of virtual objects having a highest priority exceeds one.

If there is only one virtual object having the highest priority, S805 is performed. If there are at least two virtual objects having the highest priority, S812 is performed.

S812. Determining a distance between a controlled point of each of the virtual objects having the highest priority and the operation focal point.

S813. Determining a virtual object having a smallest distance as a selected virtual object.

S814. Controlling the selected virtual object to respond to the operation instruction.

Exemplarily, when the operation instruction is an object selection instruction, the virtual object is controlled to be in a selected state; when the operation instruction is an object pickup instruction, the virtual object is controlled to be in a state of being picked up by a virtual hand (or another element); when the operation instruction is an object open instruction, the virtual object is controlled to be in an opened state; when the operation instruction is an object use instruction, the virtual object is controlled to be in a use state; when the operation instruction is an object slapping instruction, the virtual object is controlled to be in a state of being slapped by a virtual hand (or another element); when the operation instruction is an attack instruction, the virtual object is controlled to be in an attacked state.

In the disclosed virtual object selection method, when at least two virtual objects are in the three-dimensional operation range, one virtual object is selected automatically as the selected virtual object by using three factors, namely, the object type matching the operation type, the priority, and the distance, so that not only the will of independent choice of the user can be satisfied, but also the virtual object can be selected automatically, thereby reducing a quantity of times of selections by the user when there are multiple virtual objects, and efficiently and intelligently helping the user in selecting an appropriate virtual object.

Exemplary Embodiment 6

The following is an apparatus embodiment of the present disclosure, and may be configured to perform the method embodiment of the present disclosure. For details not disclosed in the apparatus embodiment of the present disclosure, refer to the method embodiment of the present disclosure.

Figure 24:
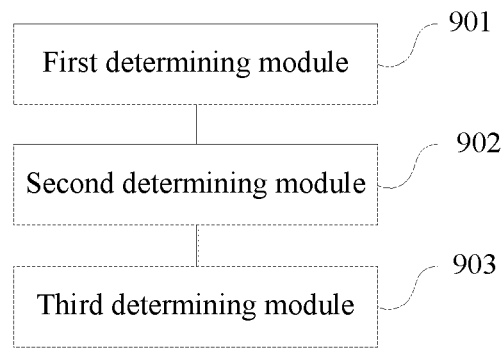
FIG. 24 is a block diagram of a virtual object selection apparatus according to an exemplary embodiment of the present disclosure.

FIG. 24 is a structural block diagram of a virtual object selection apparatus system according to an embodiment of the present disclosure. As an example, the virtual object selection apparatus is applied to the VR system shown in FIG. 16. The virtual object selection apparatus includes: a first determining module 901, a second determining module 902, and a third determining module 903.

The first determining module 901 is configured to determine a location of an operation focal point in a three-dimensional virtual environment.

Optionally, the operation focal point is point corresponding to an input device in the three-dimensional virtual environment, and the three-dimensional virtual environment includes a virtual object, and the virtual object includes a controlled point used for receiving an operation.

The second determining module 902 is configured to determine a three-dimensional operation range of the operation focal point by using the operation focal point as a reference location.

The third determining module 903 is configured to determine a virtual object whose controlled point is located in the three-dimensional operation range as a selected virtual object when an operation instruction is received.

In the disclosed virtual object selection apparatus, when the three-dimensional operation range of the operation focal point is determined using the operation focal point as the reference location, a three-dimensional operation range needs to be determined for only one operation focal point, and a response range does not need to be set for a controlled point of each virtual object, thereby resolving a problem that if a response range is set for a controlled point of each virtual object, a large amount of computing resources of a processing unit need to be consumed when there are many virtual objects in the three-dimensional virtual environment. Therefore, a three-dimensional operation range needs to be determined for only one operation focal point regardless of a quantity of virtual objects, thereby achieving an effect of saving a large quantity of computing resources of the processing unit.

Figure 25:
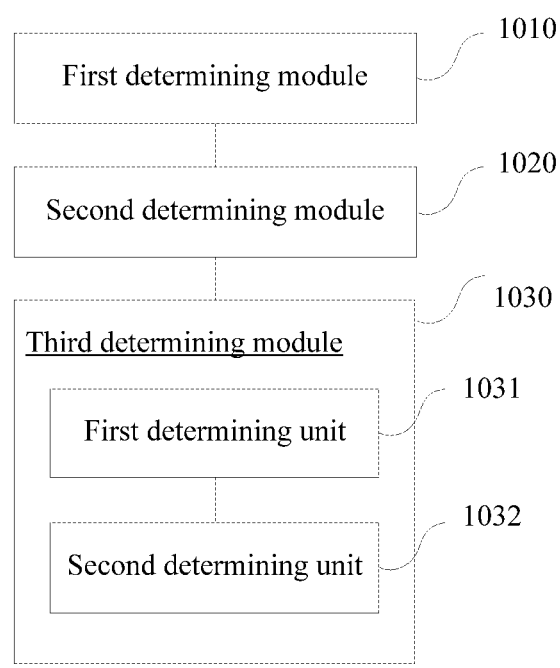
FIG. 25 is a block diagram of a virtual object selection apparatus according to another exemplary embodiment of the present disclosure.

Referring to FIG. 25, FIG. 25 is a structural block diagram of a virtual object selection apparatus system according to another embodiment of the present disclosure. As an example, the virtual object selection apparatus is applied to the VR system shown in FIG. 16. The virtual object selection apparatus includes: a first determining module 1010, a second determining module 1020, and a third determining module 1030.

The first determining module 1010 is configured to determine a location of an operation focal point in a three-dimensional virtual environment.

Optionally, the operation focal point is point corresponding to an input device in the three-dimensional virtual environment, and the three-dimensional virtual environment includes a virtual object, and the virtual object includes a controlled point used for receiving an operation.

The second determining module 1020 is configured to determine a three-dimensional operation range of the operation focal point by using the operation focal point as a reference location.

The third determining module 1030 is configured to determine a virtual object whose controlled point is located in the three-dimensional operation range as a selected virtual object when an operation instruction is received.

Optionally, the third determining module 1030 includes a first determining unit 1031 and a second determining unit 1032.

The first determining unit 1031 is configured to: when an operation instruction is received, determine a virtual object whose controlled point is located in the three-dimensional operation range.

The second determining unit 1032 is configured to when there are at least two virtual objects, determine the selected virtual object according to attribute information of the virtual objects.

Optionally, the attribute information includes at least one of an object type of the virtual object, a priority of the virtual object, and a distance between the controlled point of the virtual object and the operation focal point.

In the disclosed virtual object selection apparatus, when there are at least two virtual objects, the processing unit automatically selects one selected virtual object, so that operation steps and time costs of the user are reduced, and the will of the independent choice of the user and the convenience of automatically selecting a virtual object both can be satisfied.

Figure 26:
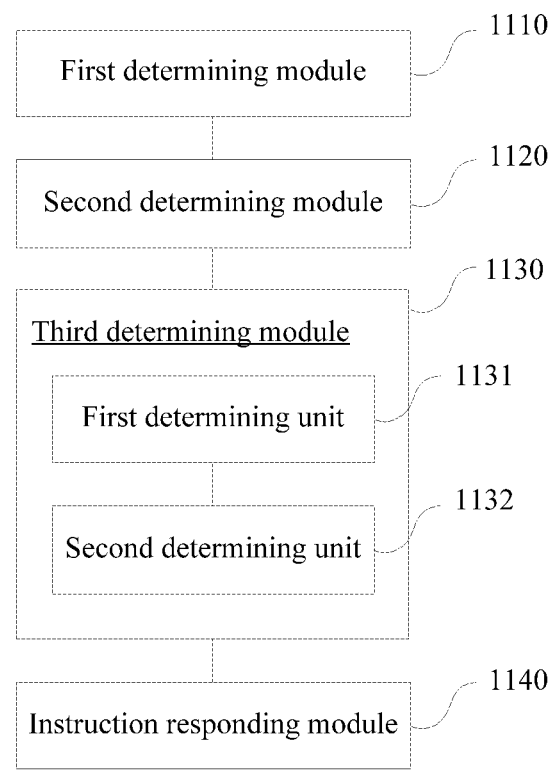
FIG. 26 is a block diagram of a virtual object selection apparatus according to another exemplary embodiment of the present disclosure.

Referring to FIG. 26, FIG. 26 is a structural block diagram of a virtual object selection apparatus system according to an embodiment of the present disclosure. As an example, the virtual object selection apparatus is applied to the VR system shown in FIG. 16. The virtual object selection apparatus includes: a first determining module 1110, a second determining module 1120, and a third determining module 1130.

The first determining module 1110 is configured to determine a location of an operation focal point in a three-dimensional virtual environment.

Optionally, the operation focal point is point corresponding to an input device in the three-dimensional virtual environment, and the three-dimensional virtual environment includes a virtual object, and the virtual object includes a controlled point used for receiving an operation.

The second determining module 1120 is configured to determine a three-dimensional operation range of the operation focal point by using the operation focal point as a reference location.

The third determining module 1130 is configured to determine a virtual object whose controlled point is located in the three-dimensional operation range as a selected virtual object when an operation instruction is received.

Optionally, the third determining module 1130 includes a first determining unit 1131 and a second determining unit 1132.

The first determining unit 1131 is configured to: when an operation instruction is received, determine a virtual object whose controlled point is located in the three-dimensional operation range.

The second determining unit 1132 is configured to when there are at least two virtual objects, determine the selected virtual object according to attribute information of the virtual objects.

Optionally, the attribute information includes at least one of an object type of the virtual object, a priority of the virtual object, and a distance between the controlled point of the virtual object and the operation focal point.

Optionally, when the attribute information includes the object type of the virtual object, the second determining unit 1132 includes an instruction obtaining subunit, a first determining subunit, and a second determining subunit. Optionally, when the attribute information includes the priority of the virtual object, the second determining unit 1132 further includes a third determining subunit, a fourth determining subunit, and a fifth determining subunit. Optionally, when the attribute information includes the distance between the controlled point of the virtual object and the operation focal point, the second determining unit 1132 further includes a sixth determining subunit and a seventh determining subunit. Optionally, when the attribute information includes at least two types of the attribute information, the second determining unit 1132 further includes an eighth determining subunit and a ninth determining subunit.

The instruction obtaining subunit is configured to obtain an operation type corresponding to the operation instruction.

The first determining subunit is configured to determine an object type corresponding to each of the virtual objects.

The second determining subunit is configured to determine, from the object type corresponding to each of the virtual objects, a target object type matching the operation type.

Optionally, the target object type is a type capable of responding to the operation instruction.

The third determining subunit is configured to determine a virtual object having the target object type as the selected virtual object.

The fourth determining subunit is configured to determine a priority of each of the virtual objects.

The fifth determining subunit is configured to determine a virtual object having a highest priority as the selected virtual object.

The sixth determining subunit is configured to determine a distance between a controlled point of each of the virtual objects and the operation focal point.

The seventh determining subunit is configured to determine a virtual object having a smallest distance as the selected virtual object.

The eighth determining subunit is configured to determine, according to an $i^{th}$ type of attribute information of each of the virtual objects, a virtual object that is selected at an $i^{th}$ time.

The ninth determining subunit is configured to: when one virtual object is selected at the $i^{th}$ time, determine the virtual object selected at the $i^{th}$ time as the selected virtual object.

The eighth determining subunit is further configured to: when at least two virtual objects are selected at the $i^{th}$ time, enable i=i+1, and re-perform the step of determining, according to the $i^{th}$ type of attribute information of each of the virtual objects, the virtual object that is selected at the $i^{th}$ time.

An initial value of i is 1 and i is an integer.

The instruction responding module 1140 is configured to control the selected virtual object to respond to the operation instruction.

In the disclosed virtual object selection apparatus, when at least two virtual objects are in the three-dimensional operation range, one virtual object is selected automatically as the selected virtual object by using three factors, namely, the object type matching the operation type, the priority, and the distance, so that not only the will of independent choice of the user can be satisfied, but also the virtual object can be selected automatically, thereby reducing a quantity of times of selections by the user when there are multiple virtual objects, and efficiently and intelligently helping the user in selecting an appropriate virtual object.

Exemplary Embodiment 7

Figure 27:
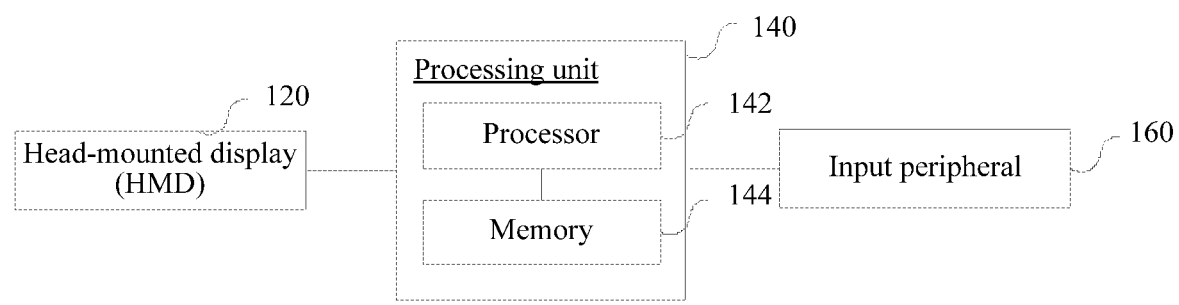
FIG. 27 is a block diagram of a VR system according to another exemplary embodiment of the present disclosure.

FIG. 27 is a schematic structural diagram of a VR system according to an exemplary embodiment of the present disclosure. The VR system includes an HMD 120, a processing unit 140, and an input device 160.

The HMD 120 is a display worn on the head of a user for image display.

The HMD 120 is electrically connected to the processing unit 140 by using a flexible circuit board or a hardware interface.

The processing unit 140 usually is integrated inside the HMD 120. The processing unit 140 includes a processor 142 and a memory 144. The memory 144 is any volatile or nonvolatile and removable or non-removable medium that is configured to store information such as a computer readable instruction, a data structure, a program module, or other data and that is implemented by using a method or a technology, for example, a RAM, a ROM, an erasable programmable ROM (EPROM), an electrically erasable programmable ROM (EEPROM), a flash memory, or another solid-state memory, a compact disc ROM (CD-ROM), a digital versatile disc (DVD), or another optical memory, a cassette, a magnetic tape, a magnetic storage or another magnetic storage device. The memory 144 stores one or more program instructions. The program instruction includes an instruction used to implement the virtual object selection method provided in the foregoing method embodiments. The processor 142 is configured to execute the instruction in the memory 144, to implement the virtual object selection method provided in the foregoing method embodiments.

The processing unit 140 is connected to the input device 160 by using a cable, a Bluetooth connection, or a WiFi connection.

The input device 160 is an input peripheral, for example, a motion sensing glove, a motion sensing joystick, a remote control, a treadmill, a mouse, a keyboard, or an eye focus device.

A non-transitory computer-readable storage medium is further provided. The storage medium may be a computer readable storage medium included in the memory in the foregoing embodiment, or may exist independently, and is not assembled into a computer readable storage medium in a terminal. The computer readable storage medium stores program instructions, and one or more processors execute the one or more program instructions to perform, e.g., the virtual object selection method.

In another embodiment, as described above, when an authentication request is received in a VR scene, to-be-authenticated fingerprint information collected by a fingerprint collection device in a physical scene is sent to an authenticator in the physical scene for authentication, so that payment authentication can be implemented without setting up a payment authentication system in the VR scene, thereby achieving a technical effect of improving the payment efficiency in the VR scene. In other words, during payment in the VR scene by using the VR scene-based authentication solution, a user is authenticated based on fingerprint information of the user. In addition, the present disclosure further provides a solution in which an identifier is generated for a user by using a virtual point array, and an identity of the user is authenticated by using the generated identifier. The generated identifier may be applied to a user authentication process in the authentication solution. For example, the identifier may replace fingerprint authentication, or after fingerprint authentication, validity check is performed on information about the user according to the generated identifier. The following describes in detail a VR-based identifier generation solution and identity authentication solution by using exemplary Embodiment 8 to Embodiment 12.

For example, A virtual reality (VR)-based identifier generation method is provided. The method may include: obtaining three-dimensional coordinates of a location of a user and an orientation of a field of view of the user; generating a virtual point array according to the three-dimensional coordinates and the orientation, each virtual point in the virtual point array having unique coordinates and a unique number; displaying the virtual point array; obtaining a selection result of the user for each virtual point in the virtual point array; and generating an identifier according to the selection result.

Optionally, a virtual point response region is set by using each virtual point as a center, and if coordinates of an input end controlled by the user falls within the virtual point response region, the virtual point is selected.

Optionally, obtaining the selection result of the user for each virtual point in the virtual point array includes: recording a real-time location of the input end controlled by the user, monitoring whether the input end enters a response region of any virtual point, and if the input end enters a response region of a virtual point, recording a number of the virtual points; and repeating the foregoing actions, and recording numbers and a sequence of virtual points selected by the user.

Optionally, generating an identifier according to the selection result includes: generating a digit string according to a number of selected virtual points and a sequence of the selected virtual point.

An identity authentication method is also provided. The method includes obtaining a preset identity of a user; determining whether a to-be-authenticated identity entered by the user is consistent with the preset identity; and if they are consistent, determining that the to-be-authenticated identity has passed the authentication; and generating the identity by: obtaining three-dimensional coordinates of a location of the user and an orientation of a field of view of the user; generating a virtual point array according to the three-dimensional coordinates and the orientation, each virtual point in the virtual point array having unique coordinates and a unique number; displaying the virtual point array; obtaining a selection result of the user for each virtual point in the virtual point array; and generating the identifier according to the selection result.

Optionally, the user selects a virtual point in the virtual point array by using a controlled input end, and the input end includes an interactive joystick.

Optionally, the user uses a virtual reality (VR) device having no joystick, and selects a virtual point in the virtual point array by using a hand as an input end.

A virtual reality (VR)-based identifier generation apparatus is further provided. The apparatus includes one or more processing units (or processors) and a memory. The memory is configured to store program instruction (and/or modules). The processing unit is coupled with the memory and when, executing the program instructions stored in the memory, configured to perform, for example, the virtual reality (VR)-based identifier generation methods and/or the identity authentication methods.

An identity authentication system is further provided. The system includes a authentication server, an application server, and a virtual reality (VR)-based identifier generation apparatus. The authentication server and the identifier generation apparatus both communicate with the application server. The authentication server is configured to store a preset identity of a user; the application server is configured to initiate an identity authentication request to the authentication server, send an identifier generated by the identifier generation apparatus to the authentication server, and obtain an identity authentication result of the authentication server.

Exemplary Embodiment 8

Figure 28:
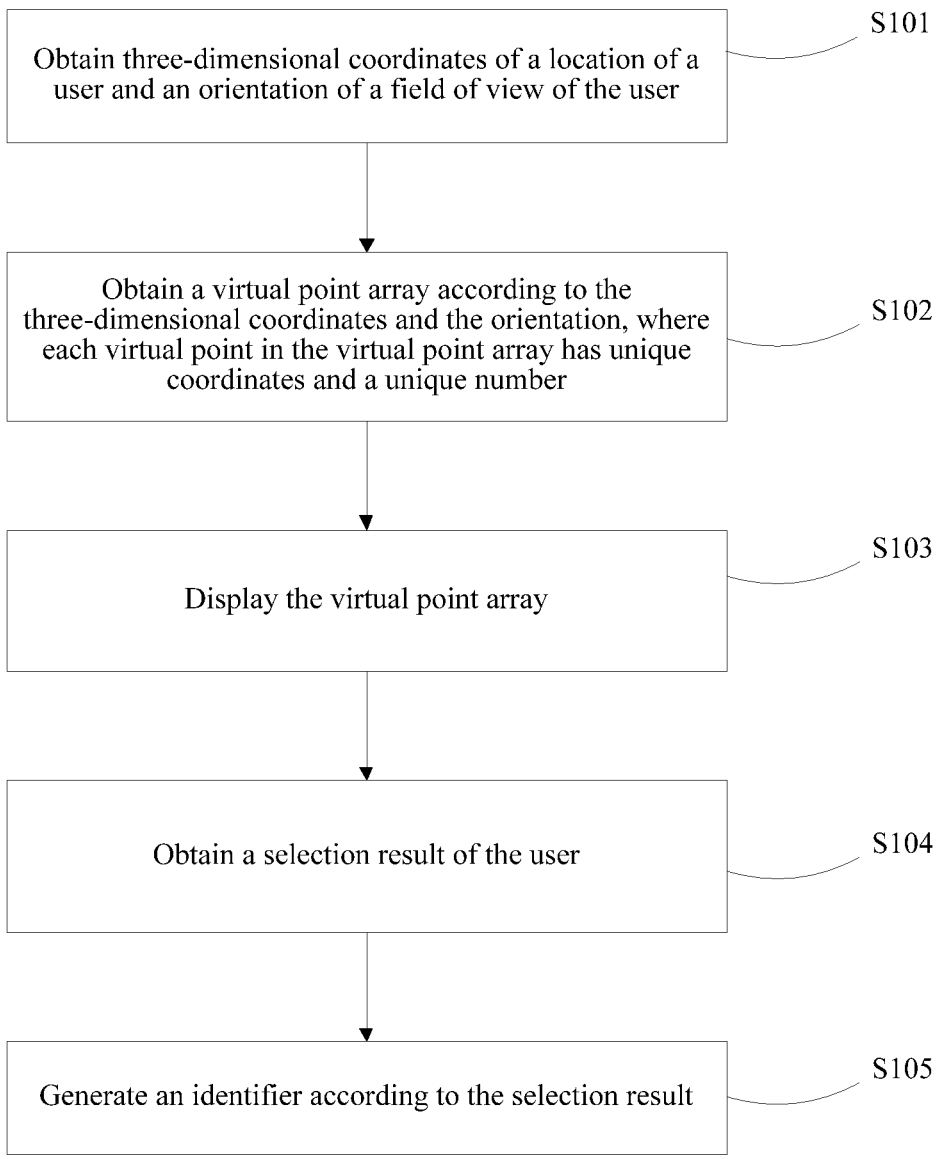
FIG. 28 is a flowchart of a VR-based identifier generation method according to an exemplary embodiment of the present disclosure.

A VR-based identifier generation method is provided. As shown in FIG. 28, the method includes the following exemplary steps.

S101. Obtaining three-dimensional coordinates of a location of a user and an orientation of a field of view of the user.

The three-dimensional coordinates (X, Y, Z) of the user and a direction vector ($\alpha$, $\beta$, $\gamma$) representing the orientation of the field of view are obtained.

S102. Generating a virtual point array according to the three-dimensional coordinates and the orientation, where each virtual point in the virtual point array has unique coordinates and a unique number.

The virtual point array is generated on a plane a distance right ahead the user based on the three-dimensional coordinates of the user and the orientation of the field of view. The virtual point array is a single-plane point array, and a normal vector of the planar point array is ($\alpha$, $\beta$, $\gamma$). In the virtual point array, a particular quantity of virtual points are generated according to a preset rule, and coordinates and a number of each virtual point are recorded. A virtual point generation rule is as follows:

a. A quantity of virtual points is not limited in terms of technology, but the quantity of virtual points cannot be excessively small or excessively large. When an excessively large quantity of points are generated, user operation is complex, and when an excessively small quantity of points are generated, security can hardly be ensured.

b. Distances between neighboring virtual points may be the same or may be different. That the distances between virtual points are the same means that a Euclidean distance between neighboring points $(X_1, Y_1, Z_1)$ and $(X_2, Y_2, Z_2)$ are the same. A Euclidean distance calculation formula is $\sqrt{(X_2-X_1)^2+(Y_2-Y_1)^2+(Z_2-Z_1)^2}$.

c. A numbering rule is that all virtual points can be traversed according to a preset sequence. The sequence may from left to right or from top to bottom, and the number may be a digit or a letter.

S103. Displaying the virtual point array.

Locations of the virtual points are clearly displayed for the user in a VR environment. A display method may be lightening, using a high-contrast color, or another method. In addition, a response region may be disposed for each virtual point. The response region is a three-dimensional spherical response region having a preset radius of R. If a Euclidean distance between coordinates of an input end controlled by the user and coordinates of a virtual point is less than R, the virtual point is selected. Certainly, the response region of the virtual point may be of any other shape.

S104. Obtaining a selection result of the user.

A real-time location of the input end controlled by the user is recorded, it is monitored whether the input end enters a response region of any virtual point, and if the input end enters a response region of a virtual point, a number of the virtual points is recorded.

The foregoing actions are repeated, and numbers and a sequence of virtual points selected by the user are recorded until user selection is completed. The selection result includes a number of a selected virtual point and a sequence of the selected virtual point. In another implementation, the selection result may include only a number of a virtual point and a unique identifier may be generated according to the number.

A specific completion manner may be: The user does not select any virtual point within a time period, or the user completes the selection by using a particular button.

S105. Generating an identifier according to the selection result.

The generating an identifier according to the selection result includes: generating a digit string or a character string according to the number of the selected virtual point and the sequence of the selected point.

Figure 29:
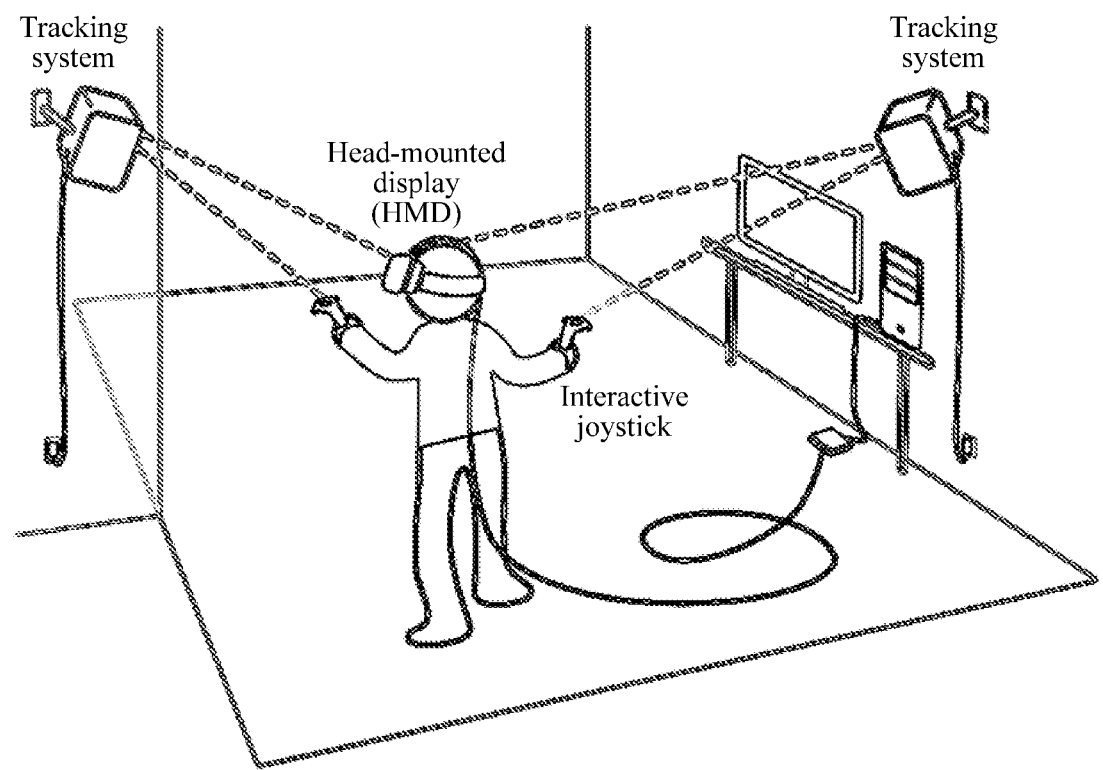
FIG. 29 is a structural diagram of a joystick-based VR device according to another exemplary embodiment of the present disclosure.

A joystick-based VR device is used. Referring to FIG. 29, the joystick-based VR device includes a tracking system, an HMD, and an interactive joystick.

1. The tracking system recognizes locations (three-dimensional coordinates) of the HMD and the interactive joystick in space.

2. The HMD is configured to display a real-time picture viewed by the user.

3. The interactive joystick is configured to perform a three-dimensional operation in the space. The input end controlled by the user is the interactive joystick.

In the VR-based identifier generation method provided herein, the user can select the virtual point only by controlling the input end to move, and the identifier is generated automatically according to the selection result of the user, so that the operation is simple, a complex virtual three-dimensional input method is not used, and the identifier generation efficiency is relatively high, thereby improving the user experience and avoiding consumption of a large quantity of system resources. The identifier generation method of the present disclosure may be used to generate an identifier such as a user name, a user ID, a codeword, or the like, and has a wide application prospect.

Exemplary Embodiment 9

A VR-based identifier generation method is provided. The method includes the following exemplary steps.

S211. Obtaining three-dimensional coordinates of a location of a user and an orientation of a field of view of the user.

The three-dimensional coordinates ($\alpha$, $\beta$, $\gamma$) of the user and a direction vector ($\alpha$, $\beta$, $\gamma$) representing the orientation of the field of view are obtained.

S212. Generating a virtual point array according to the three-dimensional coordinates and the orientation, where each virtual point in the virtual point array has unique coordinates and a unique number.

The virtual point array is a spatial point array. Virtual points in the virtual point array are deployed on N (N>1) planes. The user can view all virtual points without rotating the N planes. The N planes may be parallel with each other, or may form a closed polyhedron.

For example, if the N planes are parallel with each other, a first plane is generated right ahead the user based on the three-dimensional coordinates and the orientation of the field of view, and a second plane in parallel with the first plane is generated according to a preset gap. Briefly, normal vectors of all planes are the same, and are ($\alpha$, $\beta$, $\gamma$). Certainly, a third plane may be further generated based on the first plane and the second plane. Any suitable quantity of generated planes may be included in the present disclosure. A particular quantity of virtual points are generated on all planes according to a preset rule, and coordinates and a number of each virtual point are recorded. A virtual point generation rule is the same as that in the exemplary Embodiment 8, and details are not described herein again.

Virtual points may be deployed on four parallel planes, the virtual point array is a 4*4 spatial point array, and distances between neighboring virtual points are the same.

S213. Displaying the virtual point array.

Locations of the virtual points are clearly displayed for the user in a VR environment, and a response region may be disposed for each virtual point. The response region is a three-dimensional spherical response region having a preset radius of R. If a Euclidean distance between coordinates of an input end controlled by the user and coordinates of a virtual point is less than R, the virtual point is selected. Certainly, the response region of the virtual point may be of any other shape.

S214. Obtaining a selection result of the user.

A real-time location of the input end controlled by the user is recorded, it is monitored whether the input end enters a response region of any virtual point, and if the input end enters a response region of a virtual point, a number of the virtual point is recorded.

The foregoing actions are repeated, and numbers and a sequence of virtual points selected by the user are recorded until user selection is completed. A specific completion manner may be: The user does not select any virtual point within a time period, or the user completes the selection by using a particular button.

S215. Generating an identifier according to the selection result.

The generating an identifier according to the selection result includes: generating a digit string or a character string according to the number of the selected virtual point and the sequence of the selected point.

A VR device without a joystick is used. The VR device includes:

a visual/tracking system, configured to obtain a location (three-dimensional coordinates) of a hand in space, where the input end controlled by the user is the hand; and an HMD, configured to display a real-time picture viewed by the user.

In the exemplary VR-based identifier generation method, the user can select the virtual point only by using the hand as the input end, and the identifier is automatically generated according to the selection result of the user, so that the operation simpler.

Exemplary Embodiment 10

Figure 30:
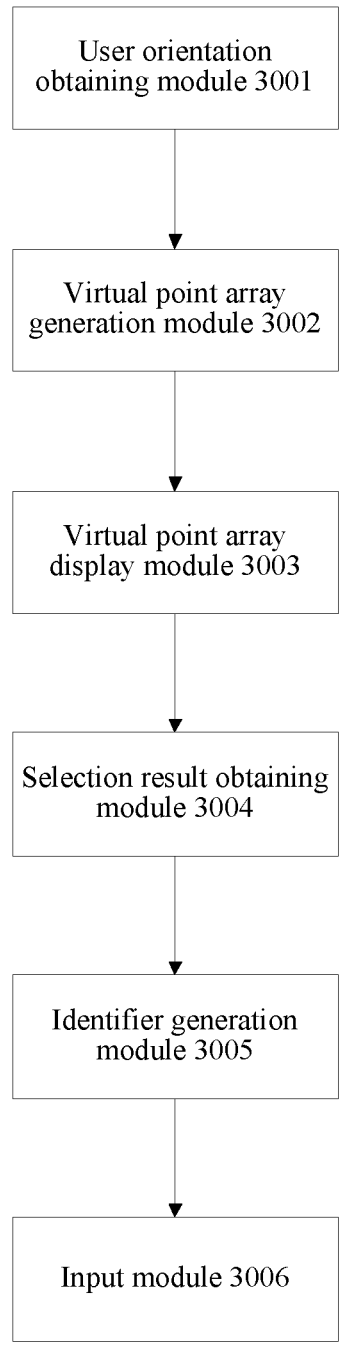
FIG. 30 is a block diagram of a VR-based identifier generation apparatus according to another exemplary embodiment of the present disclosure.

A VR-based identifier generation apparatus is provided. As shown in FIG. 30, the apparatus includes:

a user orientation obtaining module 3001, configured to obtain three-dimensional coordinates of a location of a user and an orientation of a field of view of the user;

a virtual point array generation module 3002, configured to generate a virtual point array according to the three-dimensional coordinates and the orientation, where each virtual point in the virtual point array has unique coordinates and a unique number;

a virtual point array display module 3003, configured to display the virtual point array;

a selection result obtaining module 3004, configured to obtain a selection result of the user for each virtual point in the virtual point array;

an identifier generation module 3005, configured to generate an identifier according to the selection result; and an input module 3006, configured to provide the user with an input end used for selecting the virtual point in the virtual point array, where the input module includes an interactive joystick or a VR device without a joystick.

Figure 31:
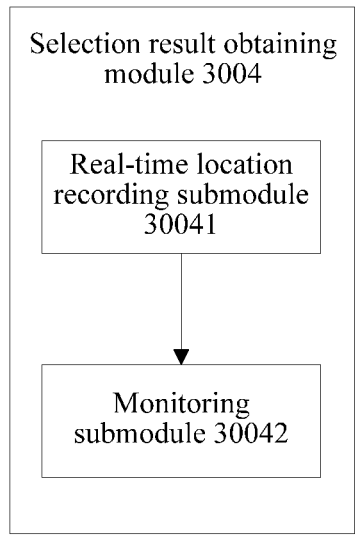
FIG. 31 is a block diagram of a selection result obtaining module according to another exemplary embodiment of the present disclosure.

For example, as shown in FIG. 31, the selection result obtaining module 3004 includes:

a real-time location recording submodule 30041, configured to record a real-time location of the input end controlled by the user; and a monitoring submodule 30042, configured to monitor whether the input end enters a response region of any virtual point, where if coordinates of the input end controlled by the user falls within the response region of a virtual point, the virtual point is selected.

The VR-based identifier generation method and apparatus are provided based on a same disclosure idea. The VR-based identifier generation apparatus can be used, e.g., to implement the VR-based identifier generation method provided in the exemplary Embodiment 8 or Embodiment 9.

Exemplary Embodiment 11

Figure 32:
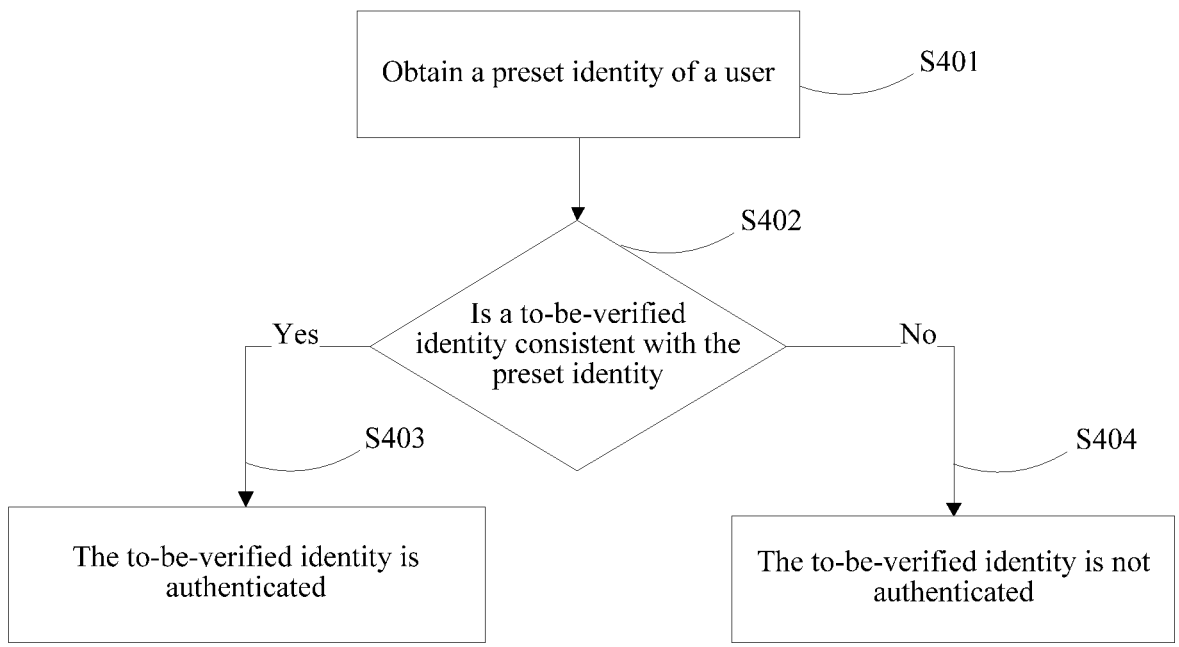
FIG. 32 is a flowchart of an identity authentication method according to another exemplary embodiment of the present disclosure.

An identity authentication method is provided. As shown in FIG. 32, the method includes the following exemplary steps:

S401. Obtaining a preset identity of a user.

S402. Determining whether a to-be-authenticated identity entered by the user is consistent with the preset identity.

S403. If the to-be-authenticated identity and the preset identity are consistent, determining that the to-be-authenticated identity has passed the authentication.

S404. If the to-be-authenticated identity and the preset identity are inconsistent, determining that the to-be-authenticated identity has unpassed the authentication.

A method for generating the identity includes:

obtaining three-dimensional coordinates of a location of the user and an orientation of a field of view of the user;

generating a virtual point array according to the three-dimensional coordinates and the orientation, each virtual point in the virtual point array having unique coordinates and a unique number;

displaying the virtual point array;

obtaining a selection result of the user for each virtual point in the virtual point array; and generating an identifier according to the selection result. The identifier generation method of the present disclosure may be used to generate a user name and/or a codeword.

For example, the user selects the virtual point in the virtual point array by controlling an input end, and the input end is an interactive joystick. In another implementation, the user selects the virtual point in the virtual point array by using a VR device without a joystick and using a hand as an input end.

When the user grants payment authorization and logs into an account, user identity needs to be authenticated. In the identity authentication method provided of the present disclosure, the user can rapidly complete user identity identification only by controlling the input end to move in space based on a preset path. As such, a step of inputting an identifier by a user in an identity authentication process is simplified, thereby improving the identity authentication efficiency. Complexity of an identifier is closely related to security of identity authentication in the identity authentication process. Therefore, in the present disclosure, a virtual point array may be designed according to actual needs, so that the experience comfortableness of the user and the security of the identity authentication both are satisfied.

Exemplary Embodiment 12

Figure 33:
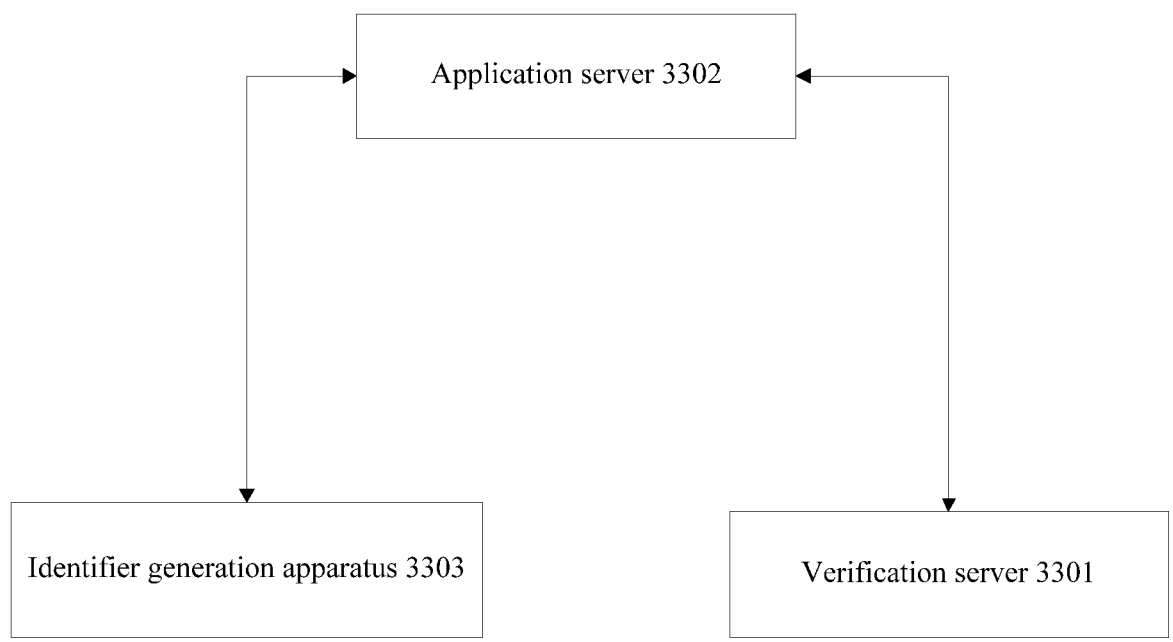
FIG. 33 is a block diagram of an identity authentication system according to another exemplary embodiment of the present disclosure.

An identity authentication system is provided. As shown in FIG. 33, the system includes an authentication server 3301, an application server 3302, and a VR-based identifier generation apparatus 3303. The authentication server 3301 and the identifier generation apparatus 3303 both communicate with the application server 3302.

The authentication server 3301 is configured to store a preset identity of a user.

The application server 3302 is configured to initiate an identity authentication request to the authentication server 3301, send an identifier generated by the identifier generation apparatus 3303 to the authentication server 3301, and obtain an identity authentication result of the authentication server 3301.

The identity authentication system is used to set and authenticate an identity. In the setting and authentication process, rules used by the identifier generation apparatus to generate an identifier, generate a virtual point array, and generate an identifier according to a virtual point selected by the user from the virtual point array may be consistent.

1. A setting process is as follows:

First, the application server 3302 initiates an identifier setting request to the authentication server 3301.

Then, the user controls the identifier generation apparatus 3303 to generate an identifier, and send the identifier to the authentication server. For example, a quantity of times that the user enters identifiers may not be limited. For example, the user needs to enter an identifier twice, and if the identifiers entered by the user twice are the same, the identifier is correctly entered.

Finally, after receiving the identifier, the authentication server 3301 notifies the application server 3302 that the identifier is successfully set, and the application server 3302 notifies the identifier generation apparatus 3303 that the identifier is successfully set.

2. An authentication process is as follows:

First, the identifier generation apparatus 3303 accesses the application server 3302.

Then, the application server 3302 sends a user identity request to the authentication server 3301.

Then, the user controls the identifier generation apparatus 3303 to generate an identifier, and send the identifier to the authentication server 3301.

Finally, the authentication server 3301 compares the received identifier with the previously specified identifier, and if they match each other, the authentication succeeds, and the authentication request of the application server 3302 is accepted.

The identifier generation apparatus 3303 includes:

a user orientation obtaining module 33031, configured to obtain three-dimensional coordinates of a location of a user and an orientation of a field of view of the user;

a virtual point array generation module 33032, configured to generate a virtual point array according to the three-dimensional coordinates and the orientation, where each virtual point in the virtual point array has unique coordinates and a unique number;

a virtual point array display module 33033, configured to display the virtual point array;

a selection result obtaining module 33034, configured to obtain a selection result of the user, where the selection result includes a number of the selected virtual point and a sequent of the selected virtual point; and an identifier generation module 33035, configured to generate an identifier according to the selection result.

The selection result recording module 33034 includes:

a real-time location recording submodule 330341, configured to record a real-time location of the input end controlled by the user; and a monitoring submodule 330342, configured to monitor whether the input end enters a response region of any virtual point, where if coordinates of the input end controlled by the user falls within the response region of a virtual point, the virtual point is selected.

A VR-based identity authentication system may be provided. This exemplary embodiment of the present disclosure can be used to implement the identity authentication method provided in the exemplary Embodiment 11.

The sequence for describing the preceding embodiments of the present disclosure are merely for description purpose, and there are no indications for an order of the embodiments.

When the integrated unit in the foregoing embodiment is implemented in the form of a software functional module and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present disclosure.

Although the embodiments of the present disclosure are described with respective emphases, related information for different embodiments of the present disclosure may not be repeated each embodiment of the present disclosure.

In the several embodiments provided in the present application, it should be understood that the disclosed client, system, and server may be implemented in other manners. The described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, and/or may be implemented in a form of a software functional unit.

The foregoing descriptions are merely exemplary implementations of the present disclosure. It should be noted that a person of ordinary skill in the art may further make several modifications and improvements without departing from the principle of the present disclosure, and the modifications and improvements shall fall within the protection scope of the present disclosure.

What is claimed is:

1. A virtual reality (VR) scene-based authentication method, comprising:

receiving an authentication request in a VR scene;

determining whether an indication identifier is directed to an authentication region in the VR scene, wherein the indication identifier in the VR scene is controlled based on an operation performed on a physical fingerprint collection device;

displaying prompt information in the VR scene upon determining that the indication identifier is directed to the authentication region, wherein the prompt information is used to prompt to enter the to-be-authenticated fingerprint information;

collecting to-be-authenticated fingerprint information by using the fingerprint collection device;

sending the to-be-authenticated fingerprint information to a physical authenticator; and receiving, in the VR scene, authentication result information sent by the authenticator, the authentication result information being used to indicate whether the to-be-authenticated fingerprint information has passed authentication.

2. The method according to claim 1, wherein after the receiving, in the VR scene, authentication result information sent by the authenticator, the method further comprises:

when the authentication result information indicates that the to-be-authenticated fingerprint information has passed the authentication, executing, in the VR scene, a resource transfer event corresponding to the authentication region.

3. The method according to claim 1, wherein the sending the to-be-authenticated fingerprint information to the physical authenticator comprises:

sending, in the VR scene, a first timestamp to the authenticator, wherein the first timestamp is a time point at which the fingerprint collection device collects the to-be-authenticated fingerprint information; and sending the to-be-authenticated fingerprint information and a second timestamp to the authenticator using the fingerprint collection device and a communication terminal device, wherein the second timestamp is a time point at which the fingerprint collection device collects the to-be-authenticated fingerprint information, the fingerprint collection device performs data transmission with the communication terminal device by using an established connection to the communication terminal device, and the first timestamp and the second timestamp are used by the authenticator to authenticate the to-be-authenticated fingerprint information.

4. The method according to claim 3, wherein the receiving, in the VR scene, authentication result information sent by the authenticator comprises:
when the authenticator determines that the first timestamp matches the second timestamp, and fingerprint information matched with the to-be-authenticated fingerprint information exists in a fingerprint database, receiving, in the VR scene, first authentication result information sent by the authenticator, wherein the first authentication result information is used to indicate that the to-be-authenticated fingerprint information has passed the authentication; and
when the authenticator determines that the first timestamp does not match the second timestamp, and/or no fingerprint information matched with the to-be-authenticated fingerprint information exists in a fingerprint database, receiving, in the VR scene, second authentication result information sent by the authenticator, wherein the second authentication result information is used to indicate that the to-be-authenticated fingerprint information has unpassed the authentication.

5. The method according to claim 1, wherein after the receiving, in the VR scene, authentication result information sent by the authenticator, the method further comprises:
displaying the authentication result information in the VR scene.

6. The method according to claim 1, wherein:
the authentication includes a payment authentication without setting up a payment authentication system in the VR scene.

7. A virtual reality (VR) device, comprising:
a memory, configured for storing program instructions, and
one or more processor, coupled with the memory and when, executing the program instructions, configured for:
receiving an authentication request in a VR scene;
determining whether an indication identifier is directed to an authentication region in the VR scene, wherein the indication identifier in the VR scene is controlled based on an operation performed on a physical fingerprint collection device;
displaying prompt information in the VR scene upon determining that the indication identifier is directed to the authentication region, wherein the prompt information is used to prompt to enter the to-be-authenticated fingerprint information;
collecting to-be-authenticated fingerprint information by using the fingerprint collection device;
sending the to-be-authenticated fingerprint information to a physical authenticator; and
receiving, in the VR scene, authentication result information sent by the authenticator, the authentication result information being used to indicate whether the to-be-authenticated fingerprint information has passed the authentication.

8. The device according to claim 7, wherein the one or more processors are further configured for:
after the authentication result information sent by the authenticator is received in the VR scene, and when the authentication result information indicates that the to-be-authenticated fingerprint information has passed the authentication, executing, in the VR scene, a resource transfer event corresponding to the authentication region.

9. The device according to claim 7, wherein the one or more processors are further configured for:
sending, in the VR scene, a first timestamp to the authenticator, wherein the first timestamp is a time point at which the fingerprint collection device collects the to-be-authenticated fingerprint information; and
sending the to-be-authenticated fingerprint information and a second timestamp to the authenticator by using the fingerprint collection device and a communication terminal device, wherein the second timestamp is a time point at which the fingerprint collection device collects the to-be-authenticated fingerprint information, the fingerprint collection device performs data transmission with the communication terminal device by using an established connection to the communication terminal device, and the first timestamp and the second timestamp are used by the authenticator to authenticate the to-be-authenticated fingerprint information.

10. The device according to claim 9, wherein the one or more processors are further configured for:
when the authenticator determines that the first timestamp matches the second timestamp, and fingerprint information matched with the to-be-authenticated fingerprint information exists in a fingerprint database, receiving, in the VR scene, first authentication result information sent by the authenticator, wherein the first authentication result information is used to indicate that the to-be-authenticated fingerprint information has passed the authentication; and
when the authenticator determines that the first timestamp does not match the second timestamp, and/or no fingerprint information matched with the to-be-authenticated fingerprint information exists in a fingerprint database, receiving, in the VR scene, second authentication result information sent by the authenticator, wherein the second authentication result information is used to indicate that the to-be-authenticated fingerprint information has unpassed the authentication.

11. The device according to claim 10, wherein the one or more processors are further configured for:
after the authentication result information sent by the authenticator is received in the VR scene, displaying the authentication result information in the VR scene.

12. The device according to claim 10, further including:
a helmet-mounted display or light-valve glasses.

13. A non-transitory computer-readable storage medium, containing program instructions for, when executed by a processor, performing a virtual reality (VR) scene-based authentication method, the method comprising:
receiving an authentication request in a VR scene;
determining whether an indication identifier is directed to an authentication region in the VR scene, wherein the indication identifier in the VR scene is controlled based on an operation performed on a physical fingerprint collection device;
displaying prompt information in the VR scene upon determining that the indication identifier is directed to the authentication region, wherein the prompt information is used to prompt to enter the to-be-authenticated fingerprint information;
collecting to-be-authenticated fingerprint information by using the fingerprint collection device;
sending the to-be-authenticated fingerprint information to a physical authenticator; and
receiving, in the VR scene, authentication result information sent by the authenticator, the authentication result information being used to indicate whether the to-be-authenticated fingerprint information has passed authentication.

14. The storage medium according to claim 13, wherein after the receiving, in the VR scene, authentication result information sent by the authenticator, the method further comprises:
when the authentication result information indicates that the to-be-authenticated fingerprint information has passed the authentication, executing, in the VR scene, a resource transfer event corresponding to the authentication region.

15. The storage medium according to claim 13, wherein the sending the to-be-authenticated fingerprint information to the physical authenticator comprises:
sending, in the VR scene, a first timestamp to the authenticator, wherein the first timestamp is a time point at which the fingerprint collection device collects the to-be-authenticated fingerprint information; and
sending the to-be-authenticated fingerprint information and a second timestamp to the authenticator using the fingerprint collection device and a communication terminal device, wherein the second timestamp is a time point at which the fingerprint collection device collects the to-be-authenticated fingerprint information, the fingerprint collection device performs data transmission with the communication terminal device by using an established connection to the communication terminal device, and the first timestamp and the second timestamp are used by the authenticator to authenticate the to-be-authenticated fingerprint information.

16. The storage medium according to claim 15, wherein the receiving, in the VR scene, authentication result information sent by the authenticator comprises:
when the authenticator determines that the first timestamp matches the second timestamp, and fingerprint information matched with the to-be-authenticated fingerprint information exists in a fingerprint database, receiving, in the VR scene, first authentication result information sent by the authenticator, wherein the first authentication result information is used to indicate that the to-be-authenticated fingerprint information has passed the authentication; and
when the authenticator determines that the first timestamp does not match the second timestamp, and/or no fingerprint information matched with the to-be-authenticated fingerprint information exists in a fingerprint database, receiving, in the VR scene, second authentication result information sent by the authenticator, wherein the second authentication result information is used to indicate that the to-be-authenticated fingerprint information has unpassed the authentication.

17. The storage medium according to claim 13, wherein after the receiving, in the VR scene, authentication result information sent by the authenticator, the method further comprises:
displaying the authentication result information in the VR scene.

18. The storage medium according to claim 13, wherein:
the authentication includes a payment authentication without setting up a payment authentication system in the VR scene.

* * * * *